United States Patent
Yoon et al.

(10) Patent No.: US 10,966,149 B2
(45) Date of Patent: Mar. 30, 2021

(54) DISPLAY DEVICE AND CONTROL METHOD THEREOF

(71) Applicant: SAMSUNG ELECTRONICS CO., LTD., Suwon-si (KR)

(72) Inventors: Sukun Yoon, Suwon-si (KR); Younghoon Moon, Suwon-si (KR); Jongha Woo, Suwon-si (KR); Minji Kim, Suwon-si (KR); Jin Seol, Suwon-si (KR); Jungyon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/295,770

(22) Filed: Mar. 7, 2019

(65) Prior Publication Data

US 2019/0281547 A1    Sep. 12, 2019

(30) Foreign Application Priority Data

Mar. 9, 2018 (KR) .................. 10-2018-0028309
May 23, 2018 (KR) .................. 10-2018-0058643

(51) Int. Cl.
*H04W 52/02* (2009.01)
*G06F 3/14* (2006.01)
(Continued)

(52) U.S. Cl.
CPC .......... *H04W 52/0229* (2013.01); *G06F 3/14* (2013.01); *H04N 21/4122* (2013.01);
(Continued)

(58) Field of Classification Search
CPC ..... H04W 52/00229; H04W 4/80; G06F 3/14; H04N 21/4122; H04N 21/42684; H04N 21/43615; H04N 21/4436; H04N 21/42221
(Continued)

(56) References Cited

U.S. PATENT DOCUMENTS 9,131,331 B2    9/2015  Park et al.
2011/0129196 A1  6/2011  Hayashi
(Continued)

FOREIGN PATENT DOCUMENTS

EP    3016397       *    5/2016
EP    3016397 A1         5/2016
(Continued)

OTHER PUBLICATIONS

Sia Mom, "[Samsung TV recommendation/ The Frame TV] Did you listen Art mode TV", Nov. 14, 2017, retrieved from :https://blog.naver.com/hyesu0413/221088122647, (11 pages total).
(Continued)

*Primary Examiner* — Yuwen Pan
*Assistant Examiner* — Angelica M Perez
(74) *Attorney, Agent, or Firm* — Sughrue Mion, PLLC

(57) ABSTRACT

A display device includes a display; a memory storing at least one instruction; a communicator configured to communicate with a mobile device via a BLE communication network; and a controller including a processor configured to execute the at least one instruction stored in the memory. The processor is further configured to execute the at least one instruction to manage BLE identification information when the BLE identification information for identifying the mobile device connected via the BLE communication network is received from the mobile device during a normal mode in which an ambient service is being executed, and the
(Continued)

communicator is further configured to, based on the BLE identification information received from the mobile device after a sleep mode is started, determine whether to wake up the controller based on whether information corresponding to the BLE identification information is stored in the communicator.

24 Claims, 21 Drawing Sheets

(51) Int. Cl.
  H04N 21/426 (2011.01)
  H04N 21/443 (2011.01)
  H04N 21/436 (2011.01)
  H04N 21/41 (2011.01)
  H04W 4/80 (2018.01)
  H04N 21/422 (2011.01)

(52) U.S. Cl.
  CPC . *H04N 21/42684* (2013.01); *H04N 21/43615* (2013.01); *H04N 21/4436* (2013.01); *H04N 21/42221* (2013.01); *H04W 4/80* (2018.02)

(58) Field of Classification Search
  USPC .................................. 455/41.1–41.3
  See application file for complete search history.

(56) References Cited

U.S. PATENT DOCUMENTS

| | | | |
|---|---|---|---|
| 2013/0259230 A1 | 10/2013 | Polo et al. | |
| 2014/0378057 A1* | 12/2014 | Ramon | H04L 9/3236 455/41.2 |
| 2015/0099467 A1* | 4/2015 | Kang | H04W 52/0229 455/41.2 |
| 2016/0127675 A1 | 5/2016 | Ahn | |
| 2016/0128049 A1* | 5/2016 | Phillips-Lubimiv | H04L 67/28 370/329 |
| 2017/0091437 A1 | 3/2017 | Lee et al. | |
| 2017/0180918 A1 | 6/2017 | Yang et al. | |
| 2017/0201886 A1 | 7/2017 | Yang et al. | |
| 2017/0223514 A1* | 8/2017 | Do | H04W 4/80 |
| 2018/0321731 A1* | 11/2018 | Alfano | G06F 1/3231 |

FOREIGN PATENT DOCUMENTS

| | | | |
|---|---|---|---|
| EP | 3115882 A1 | | 1/2017 |
| KR | 10-2013-0111165 A | | 10/2013 |
| KR | 10-2014-0074152 A | | 6/2014 |
| KR | 10-2014-0074155 A | | 6/2014 |
| KR | 1020140074152 | * | 6/2014 |
| KR | 10-2015-0040128 A | | 4/2015 |
| KR | 10-2015-0136645 A | | 12/2015 |
| KR | 10-2016-0050879 A | | 5/2016 |
| KR | 10-2016-0080567 A | | 7/2016 |
| WO | 2014121294 A1 | | 8/2014 |

OTHER PUBLICATIONS

J Lindh et al., "BLE Address Types", Apr. 2, 2015, retrieved from https://e2e.ti.com/support/wireless_connectivity/bluetooth_low_energy/f/538/t/247015 , (4 pages total).

International Search Report (PCT/ISA/210) and Written Opinion (PCT/ISA/237) dated Jul. 8, 2019 issued by the International Searching Authority in International Application No. PCT/KR2019/002643.

Communication dated Jun. 17, 2019, issued by the European Patent Office in counterpart European Application No. 19161701.8.

Communication dated Jun. 14, 2019, issued by the Korean Intellectual Property Office in counterpart Korean Patent Application No. 10-2018-0058643.

Communication dated Jan. 28, 2021, issued by the Indian Intellectual Property Office in Indian Patent Application No. 201944009070.

\* cited by examiner

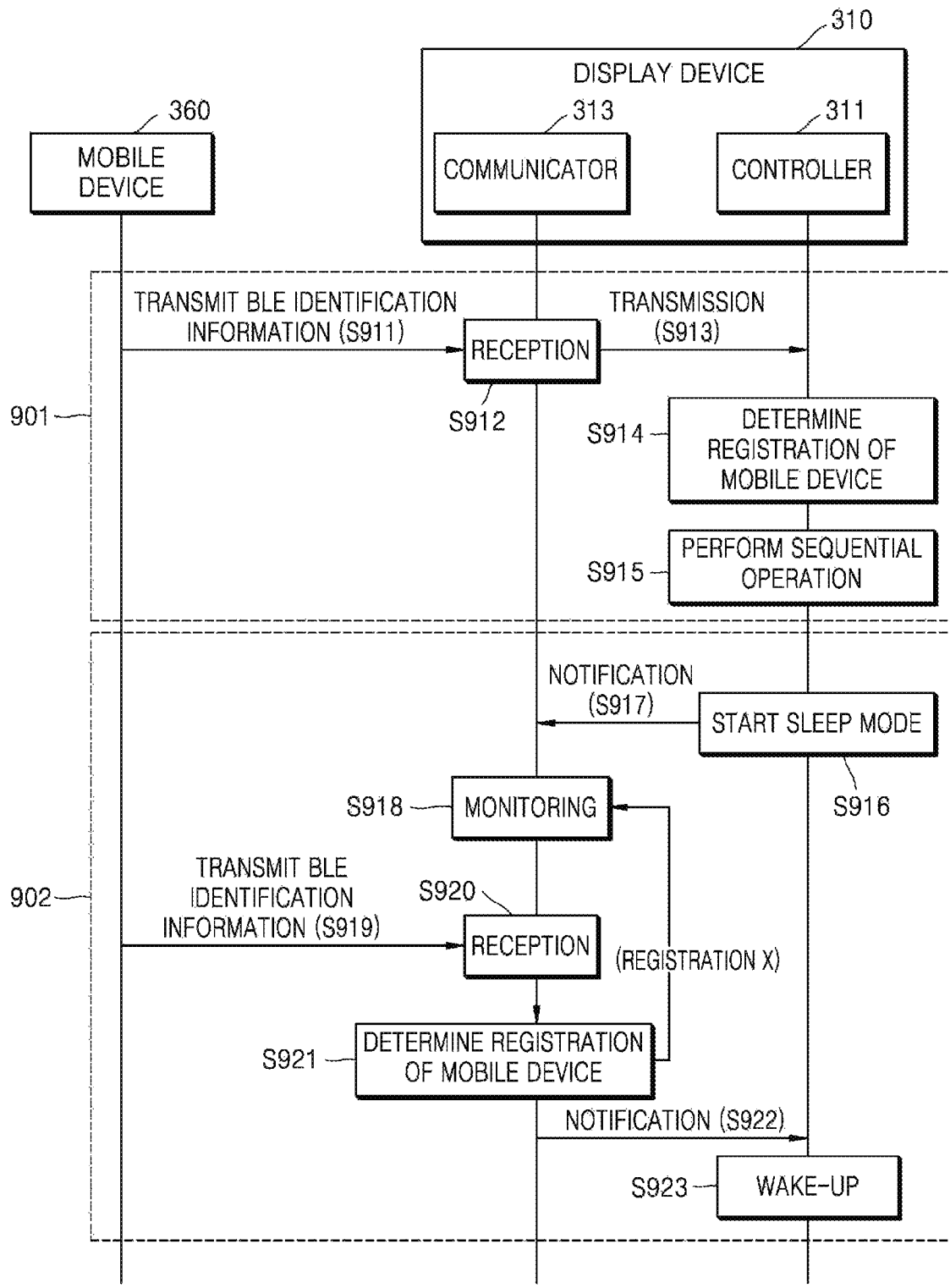

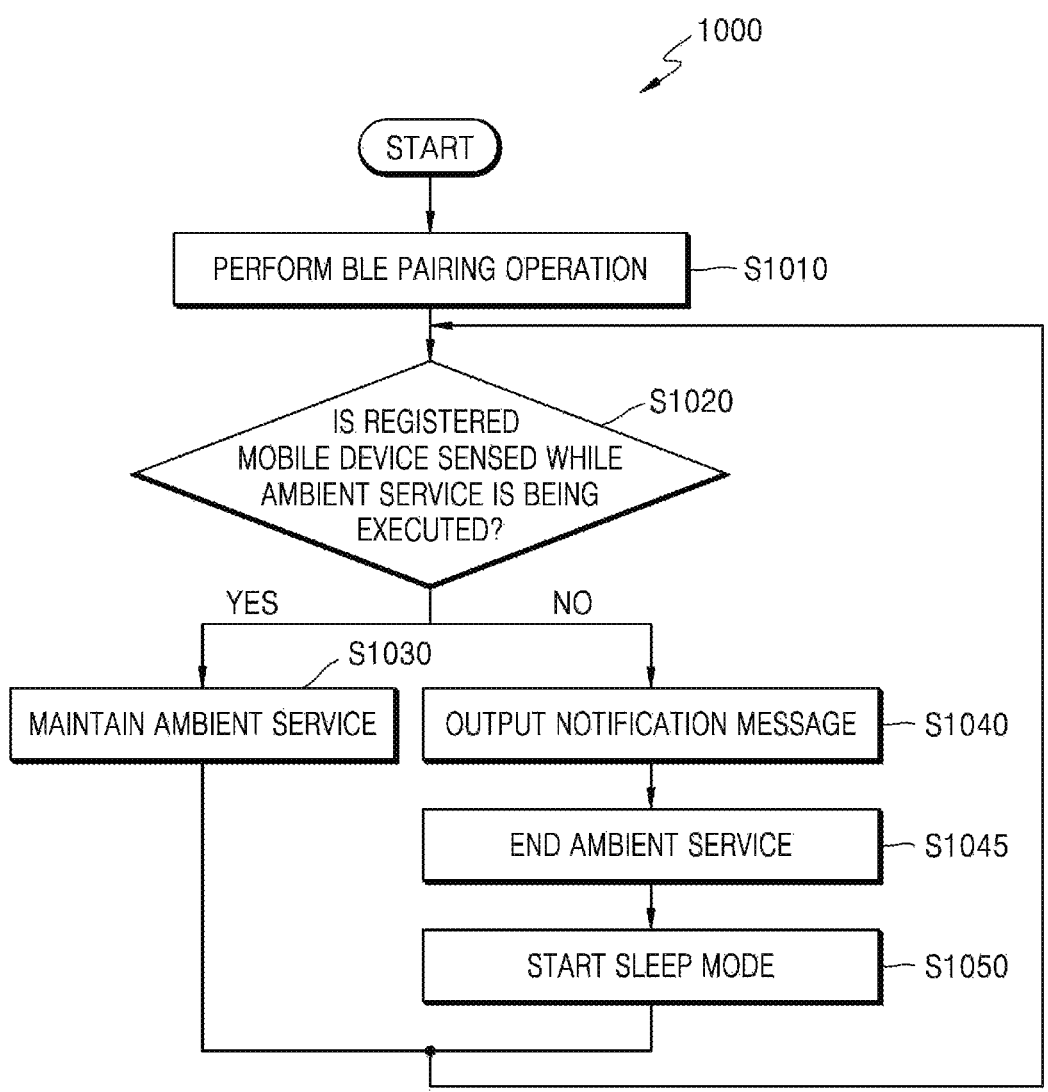

DISPLAY DEVICE AND CONTROL METHOD THEREOF

CROSS-REFERENCE TO RELATED APPLICATION(S)

This application is based on and claims priority under 35 U.S.C. § 119 to Korean Patent Application Nos. 10-2018-0028309, filed on Mar. 9, 2018, and 10-2018-0058643, filed on May 23, 2018 in the Korean Intellectual Property Office, the disclosures of which are incorporated by reference herein in their entireties.

BACKGROUND

1. Field

The disclosure relates to a display device configured to communicate with a mobile device via a wireless communication network and a control method thereof.

In detail, the disclosure relates to a control method of a display device configured to communicate with a mobile device connected via a Bluetooth low energy (BLE) communication network, and the display device.

2. Description of Related Art

As mobile devices are widely used, technology is being developed to enable a mobile device and an electronic device to connect to each other via a wireless communication network, and to allow a plurality of connected electronic devices be used while interoperating with each other. The mobile devices may include portable user electronic devices.

Also, technology is being developed to control a plurality of non-portable electronic devices by using a home Internet of Things (IoT) platform or the like, and to use and/or control the plurality of non-portable electronic devices by connecting them with a mobile device.

The wireless communication network may include a communication network that meets the Bluetooth communication standard for wireless communication using low power, for example, a BLE communication network.

SUMMARY

In accordance with an aspect of the disclosure, there is provided a control method of a display device capable of providing an ambient service, and the display device.

According to embodiments of the disclosure, there is provided a control method of a display device capable of providing an ambient service while decreasing power consumption of the display device, and the display device.

Additional aspects will be set forth in part in the description which follows and, in part, will be apparent from the description, or may be learned by practice of embodiments.

In accordance with an aspect of the disclosure, a display device includes a display; a memory storing at least one instruction; a communicator configured to communicate with a mobile device via at least one wireless network including a BLE communication network; and a controller including at least one processor configured to execute the at least one instruction stored in the memory. The processor may be configured to execute the at least one instruction to manage BLE identification information when the BLE identification information that is information for identifying the mobile device connected via the BLE communication network is received from the mobile device during a normal mode in which an ambient service is being executed. The communicator may be further configured to wake up the controller based on a result of determining whether information corresponding to the BLE identification information is present, when the BLE identification information is received from the mobile device after a sleep mode is started.

The communicator may include an internal memory configured to store data, and may be further configured to wake up the controller when the information corresponding to the BLE identification information is present in the internal memory.

When the information corresponding to the BLE identification information is not present in the internal memory, the communicator may be further configured to maintain the sleep mode.

The processor may be further configured to execute, in the normal mode, the at least one instruction to receive the BLE identification information from the communicator, determine whether the information corresponding to the BLE identification information is present in the memory, and decide whether to maintain the executing of the ambient service, based on a result of the determining.

The memory may include a first memory and a second memory, and the processor may be further configured to execute the at least one instruction to control the BLE identification information to be stored in the first memory and an internal memory of the communicator when the BLE identification information is received from the mobile device in the normal mode, and when the normal mode is started, load a program corresponding to a first application to the second memory, the first application being for executing the ambient service, and control the first application to be executed.

The processor may be further configured to execute the at least one instruction to receive first BLE identification information from a first mobile device to be paired with the display device to register the first mobile device, and store the first BLE identification information in the memory, and manage storing and updating of the BLE identification information to allow the first BLE identification information to be stored in the memory and an internal memory of the communicator.

The normal mode may include an operation mode in which the ambient service is executed, and the sleep mode may include an operation mode in which the ambient service is stopped and then the display is turned off.

The processor may be further configured to execute the at least one instruction to control first BLE identification information to be stored in the memory, the first BLE identification information being transmitted from a first mobile device paired with the display device for execution of the ambient service, and determine, by using the first BLE identification information, whether the first mobile device is positioned within a predetermined distance from the display device.

The processor may be further configured to execute the at least one instruction to differently set a scheme of recognizing a mobile device, according to whether an operating system (OS) of a mobile device registered in the display device is a first OS or a second OS.

The first OS may be an Android OS and the second OS may be an iOS.

When the mobile device is registered in the display device and an OS of the mobile device is the first OS, the processor may be further configured to execute the at least one instruction to control the communicator to check reception of the BLE identification information at certain time intervals.

When the mobile device is registered in the display device and an OS of the mobile device is the second OS, the processor may be further configured to execute the at least one instruction to control the communicator to transmit, at certain time intervals, a first iBeacon signal for requesting transmission of the BLE identification information to the mobile device, and check reception of a second iBeacon signal triggered by the first iBeacon signal and including the BLE identification information.

The BLE identification information may include a BLE media access control (MAC) address of the mobile device or a random address of the mobile device that is convertible to the BLE MAC address by using an Identity Resolving Key (IRK).

According to an embodiment, a control method of a display device is provided, the display device including a memory storing at least one instruction, a communicator configured to communicate with a mobile device via at least one wireless network including a BLE communication network, and a controller including at least one processor configured to execute the at least one instruction stored in the memory. The control method may include managing, by the controller, BLE identification information when the BLE identification information that is information for identifying the mobile device connected via the BLE communication network is received from the mobile device during a normal mode in which an ambient service is being executed; and waking up, by the communicator, the controller based on a result of determining whether information corresponding to the BLE identification information is present, when the BLE identification information is received from the mobile device after a sleep mode is started.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a diagram for describing operations performed by the display device, according to an embodiment;

FIG. 10 is a diagram for describing operations performed by a display device, according to an embodiment;

DETAILED DESCRIPTION

Figure 1:
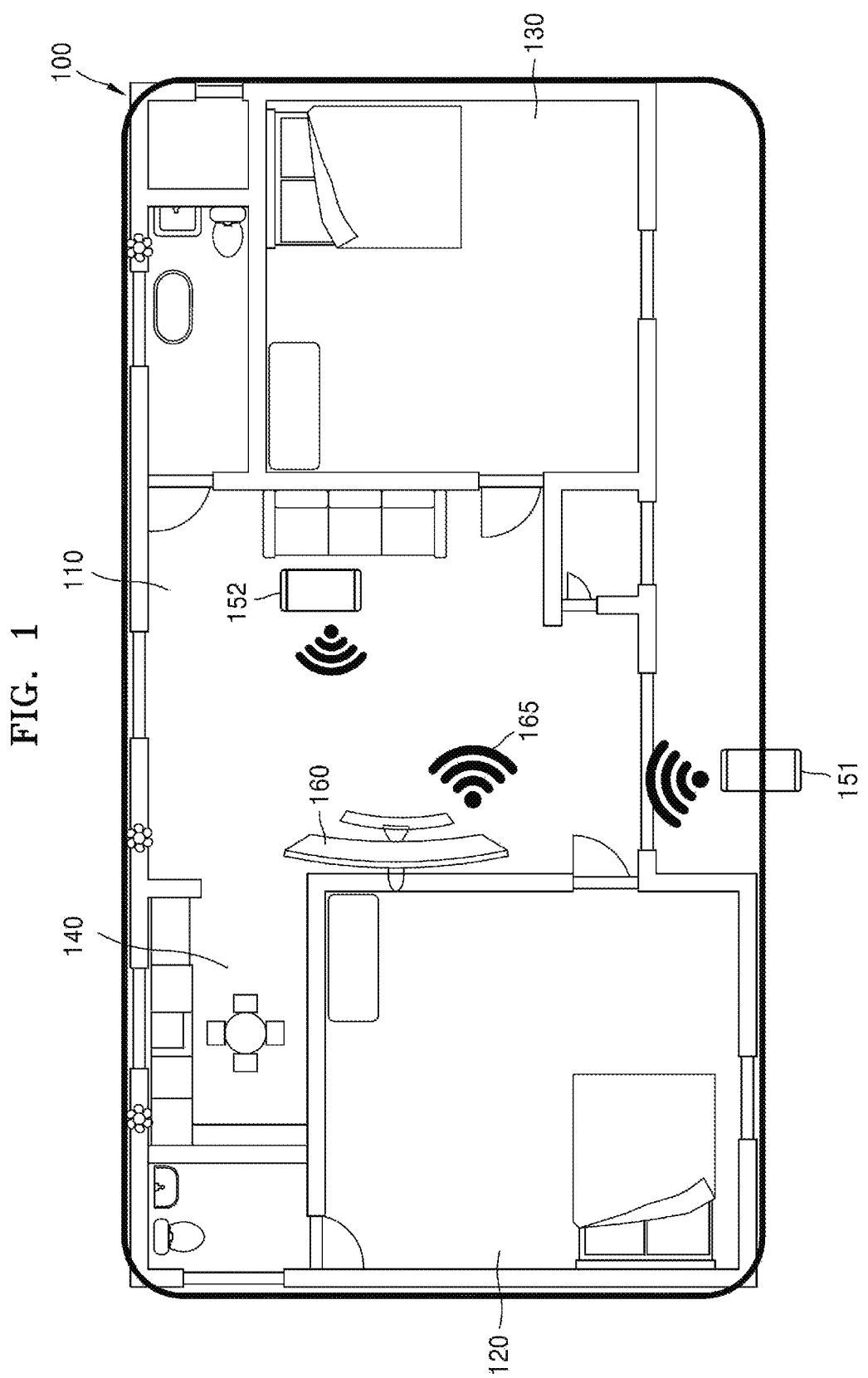
FIG. 1 illustrates a plurality of electronic devices that are connectable via a BLE communication network in a house.

The disclosure described below with reference to the accompanying drawings for one of ordinary skill in the art to be able to perform the disclosure without any difficulty. The disclosure may, however, be embodied in many different forms and should not be construed as being limited to the embodiments set forth herein. In addition, portions irrelevant to the description of the disclosure will be omitted in the drawings for a clear description of the disclosure, and like reference numerals will denote like elements throughout the specification.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

Throughout the specification, the expression "in some embodiments" or "in an embodiment" is described, but the expression does not necessarily indicate the same embodiment.

Some embodiments may be described in terms of functional block components and various processing steps. Some or all of functional blocks may be realized by any number of hardware and/or software components configured to perform the specified functions. For example, the functional blocks of the disclosure may be implemented by one or more processor or microprocessors, or may be implemented by circuit components for predetermined functions. For example, the functional blocks of the disclosure may be implemented with any programming or various scripting languages. The functional blocks of the disclosure may be implemented in algorithms that are executed on one or more processors. Further, the disclosure could employ any number of techniques according to the related art for electronics configuration, signal processing and/or data processing, and the like. The terms "module", "configuration", or the like may be broadly used and are not limited to mechanical or physical embodiments.

The connecting lines or connectors between elements shown in drawings are intended to represent exemplary functional connection and/or physical or logical connection between the elements. It should be noted that many alternative or additional functional connections, physical connections or logical connections may be present in a practical device.

Throughout the disclosure, the expression "at least one of a, b or c" indicates only a, only b, only c, both a and b, both a and c, both b and c, all of a, b, and c, or variations thereof.

An electronic device connected to a mobile device by using BLE may be controlled based on a BLE signal transmitted from the mobile device. The electronic device may be a fixed device such as a display device which is maintained at a same position in a house.

According to the related art, BLE was designed as a technology in which a fixed device transmits a BLE signal and a mobile device periodically senses the BLE signal and determines a position thereof. The mobile device may determine whether the fixed device is positioned within a particular distance, based on the BLE signal transmitted from the fixed device. As a result of the determination, the mobile device may control a screen of the fixed device to be turned on or off.

As another example, the mobile device may transmit a BLE signal and the fixed device may sense the BLE signal.

As described above, a method and apparatus for controlling an operation of a fixed device via BLE-communication between the fixed device and a mobile device are being developed. Also, a method and apparatus for controlling an operation of a fixed device to satisfy various needs (such as, having to be provided a particular service, or the like) of a user who uses the fixed device or a mobile device are being developed.

Therefore, there is a need for a method and apparatus for conveniently controlling an operation of a fixed device with minimum power consumption. Also, there is a need for a method and apparatus for flexibly performing a control operation according to a provision direction of a user-desired service.

Also, a method and apparatus for controlling an operation of a fixed device to satisfy various needs (such as, having to be provided a particular service, or the like) of a user who uses the fixed device or a mobile device are being developed.

Therefore, there is a need for a method and apparatus for conveniently controlling an operation of a fixed device with minimum power consumption. Also, there is a need for a method and apparatus for flexibly performing a control operation according to a provision direction of a user-desired service.

FIG. 1 illustrates a plurality of electronic devices that are connectable via a BLE communication network in a house.

An electronic device according to an embodiment may include any electronic device that is connectable to another electronic device via a wireless communication network. The electronic device according to an embodiment may include a display device that is connectable to a mobile device via the BLE communication network.

The electronic device according to an embodiment may include any electronic device that may exchange data with at least one adjacent electronic device, may be paired with the at least one adjacent electronic device, may remotely control the at least one adjacent electronic device, or may be remotely controlled by the at least one adjacent electronic device, via a wireless communication network. The wireless communication network may include the BLE communication network.

The electronic device according to an embodiment may include any electronic device that is connectable to a portable electronic device such as a mobile device via the BLE communication network. The electronic device may be an electronic device capable of receiving or scanning for a BLE signal 165. An electronic device configured to transmit a BLE signal 165 may be an electronic device capable of scanning for the BLE signal 165 continuously, at periodic time intervals, or at a set time.

The electronic device according to an embodiment is a display device 160 attached onto a wall in a house 100.

A display device according to an embodiment may be a device configured to visually output contents, advertisements, guide information, or a UI screen to a user, and may variously include a television (TV), a terminal for digital broadcasting, or the like. Also, the display device may be included in an electronic device such as a refrigerator (e.g., the display device may be a display inserted onto a front of the refrigerator, or the like). Also, the display device may be fixed in a certain space.

Referring to FIG. 1, a plan of the house 100 is shown. A space in the house 100 may be divided into bedrooms 120 and 130, a kitchen 140, and a living room 110. The display device 160 may be placed in the living room 110. The display device 160 may be a curved display device attached onto a wall.

Any member of a family of the house 100 may be a user of the display device 160. The user may have a first portable device 152. The first portable device 152 and the display device 160 may be connected via a wireless communication network. The first portable device 152 may be a mobile computing device including a wearable device, a smartphone, a tablet personal computer (PC), a personal digital assistant (PDA), a laptop computer, a media player, a micro server, a global positioning system (GPS) device, or the like.

The first portable device 152 and the display device 160 may be connected by using a home IoT platform. The display device 160 and the first portable device 152 may be connected to each other via the wireless communication network.

In an embodiment, the display device 160 may operate under the control of the first portable device 152, and may sense a position of the first portable device 152 and may automatically perform a certain service such as an ambient service, or a certain operation. In the disclosure, the term 'ambient service' indicates a context-aware service related to a surrounding environment of a user or device.

When the first portable device 152 transmits a BLE signal and the display device 160 is positioned within a predetermined distance from the first portable device 152, the display device 160 may sense the BLE signal. That is, the display device 160 may sense a BLE signal only when the BLE signal is transmitted within a certain distance. For example, a BLE signal sensing range may be more or less 10 meters. Thus, when a second portable device 151 transmits a BLE signal at a position outside the house 100, the display device 160 might not sense the BLE signal.

By using the BLE signal sensing range, the display device 160 may be turned on or off based on a BLE signal transmitted from the first portable device 152. That is, the display device 160 may sense, by using a portable device of a user, that the user is coming close to the display device 160, and may be turned on or off in response to a result of the sensing.

The ambient service is a new application or a new service of a display device such as a TV. The ambient service is a service for providing a meaningful screen image instead of a black screen when the TV is turned off to user.

Figure 2A:
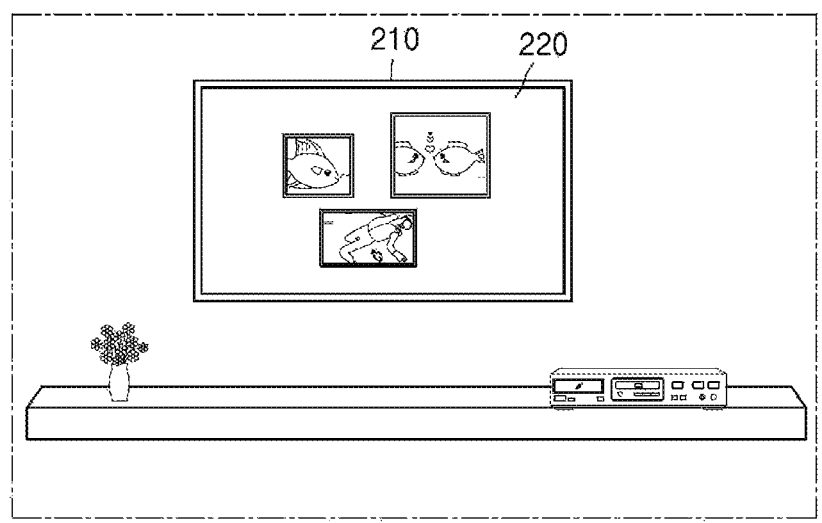
FIG. 2A illustrates display device providing an ambient service for displaying a screen image.
Figure 2B:
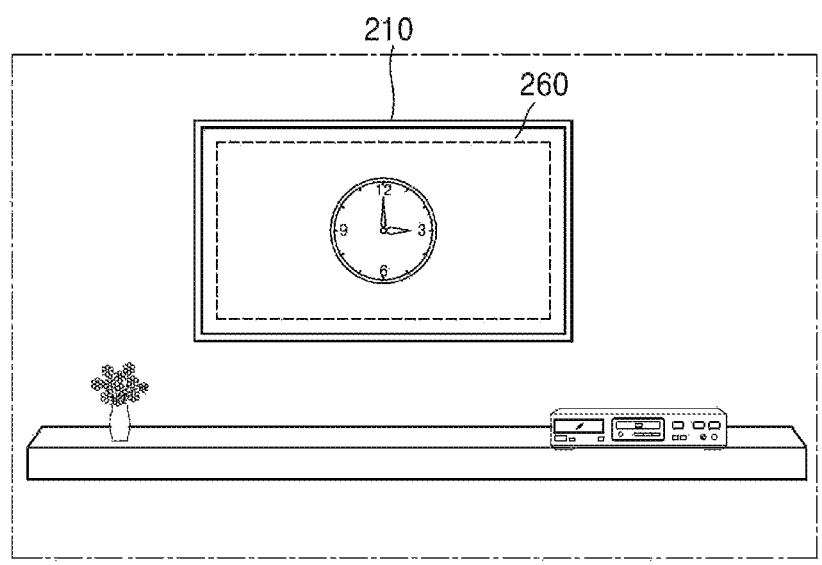
FIG. 2B illustrates display device providing an ambient service for displaying a screen image.

FIGS. 2A and 2B illustrate display device providing an ambient service for displaying a screen image.

In general, when a TV is turned off, a screen of the TV turns black and does not display any image. An ambient service is a service for displaying, on a display, a meaningful screen image such as a famous painting, a photo, a clock, or the like, instead of a black screen, when the TV is turned off. Also, when a user does not watch particular content broadcast from a broadcasting station, the ambient service allows the meaningful screen image such as a famous painting, a photo, a clock, or the like to be displayed on the display.

Referring to FIG. 2A, a display device 210 may display a screen image 220 including at least one photo on a display of the display device 210. Because the display device 210 displays at least one photo, a user may recognize the display device 210 as a photo frame. In an embodiment shown in FIG. 2A, the display device 210 may operate as an electronic photo frame.

Referring to FIG. 2B, a display device 210 may display a screen image 260 including a clock on a display of the display device 210.

While the display device 210 is executing the ambient service, the user may view the famous painting, the photo, or the like on the display device 210. As another example, the user may know a time based on a clock of the screen image 260 displayed by the display device 210.

While the user does not watch content, the ambient service displays a screen image according to the user's intention, thereby increasing user convenience. However, while the ambient service is executed, the display of the display device 210 maintains its turned-on state, and thus, a service life of a panel of the display may be decreased and power consumption continuously occurs.

Therefore, it is required to decrease power consumption while providing the ambient service that meets a user's desire.

Therefore, to prevent power consumption in the display device 210 and a decrease in a service life of a panel of the display, the display may be turned off when a user is neither in the house 100 nor in front of a TV. In an embodiment, a BLE signal transmitted from a mobile device may be used to control a screen on which the ambient service is executed or to turn on or off the display.

Figure 3:
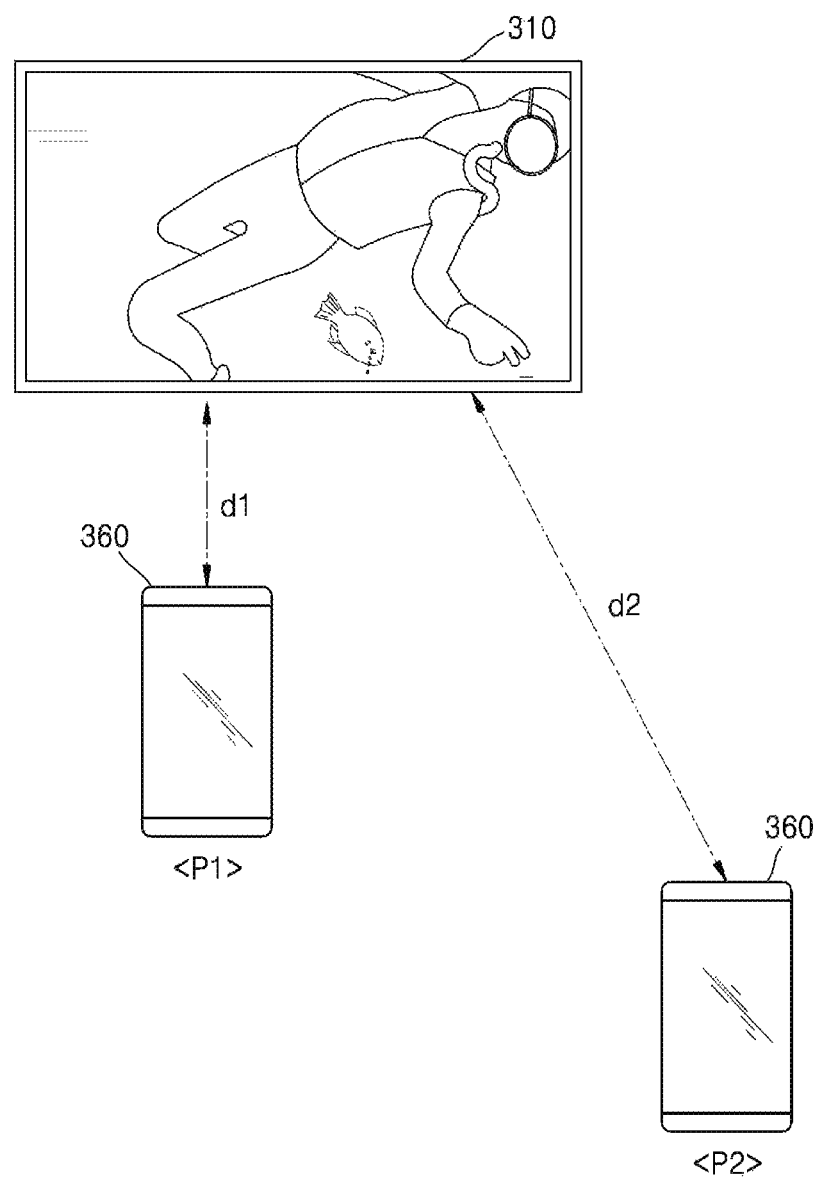
FIG. 3 illustrates a display device connected via a BLE wireless network.
Figure 4:
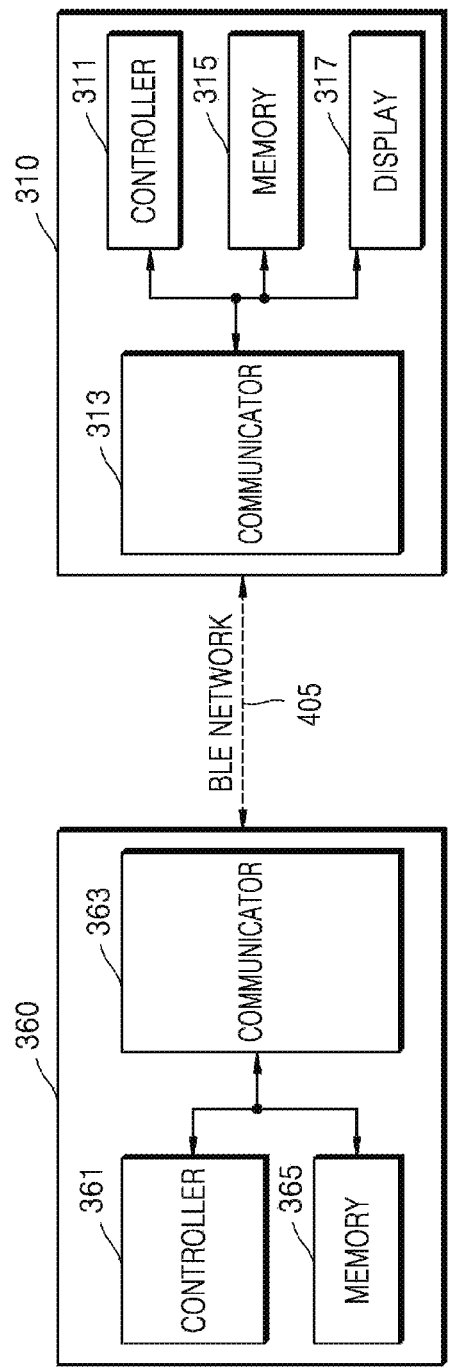
FIG. 4 illustrates a display device and a mobile device that are connected via a BLE wireless network, according to an embodiment.

With reference to FIGS. 3 and 4, an operation of a display device which is performed based on a BLE signal is described.

FIG. 3 illustrates a display device 310 connected via a BLE wireless network The display device 310 may correspond to any one of the display devices 160 and 210.

Referring to FIG. 3, the display device 310 according to an embodiment may sense a BLE signal transmitted from a mobile device 360. The display device 310 may constantly or periodically scan for a BLE signal. As another example, the display device 310 may transmit a BLE signal to the mobile device 360, and in response thereto, when the mobile device 360 transmits a BLE signal to the display device 310, the display device 310 may scan for the BLE signal transmitted from the mobile device 360. A BLE signal may be generated as one of various forms including a BLE packet, an iBeacon signal, or the like. Therefore, when the display device 310 receives a BLE signal, the display device 310 may receive the BLE signal is any one of the various forms including a BLE packet, an iBeacon signal, or the like.

That is, the mobile device 360 may operate as a transmitting terminal transmitting a BLE signal, and the display device 310 may operate as a receiving terminal receiving the BLE signal. That is, the display device 310 may be a device that receives a BLE signal and is controlled (e.g., controlled to turn on or off a display of the display device 310) in response to the received BLE signal.

An operation of receiving a BLE signal may include a case in which the BLE signal is sensed by scanning for the BLE signal at certain time intervals or by continuously scanning for the BLE signal. The operation of receiving a BLE signal may include a case in which transmission of a BLE signal is requested, and in response to the request, the BLE signal is received.

The BLE signal may be a signal generated according to BLE communication protocols and may include a BLE packet.

The transmitting terminal may include the mobile device 360 and any one of other portable electronic devices (e.g., a smartwatch, a tablet PC, or the like). The receiving terminal may include not only the display device 310 but may also include any electronic device (e.g., a speaker, a refrigerator, or the like) capable of performing a BLE scanning operation. The transmitting terminal may continuously transmit a BLE signal (e.g., a BLE packet) or transmit it in response to a periodic request, and the receiving terminal may perform a BLE scanning operation at a set time or at periodic time intervals or may request the mobile device 360 for a BLE signal (e.g., a BLE packet), the mobile device 360 being the transmitting terminal.

The mobile device 360 that is the transmitting terminal may include a Bluetooth communication module capable of transmitting a BLE signal, and may include an application in which setting of a BLE advertisement is available. The BLE advertisement may refer to transmission of a BLE signal according to BLE communication protocols or may refer to the transmitted BLE signal. According to setting of the BLE advertisement, a BLE signal may be transmitted as a packet (e.g., a BLE advertise packet, a BLE advertising packet, or the like).

The display device 310 that is the receiving terminal may include a Bluetooth communication module capable of receiving a BLE signal, and may include an application by which an On/Off control with respect to the display is available based on the received BLE signal.

In an example shown in FIG. 3, d1 refers to a BLE signal receivable range, and d2 is a value greater than d1 and exceeds the BLE signal receivable range.

Referring to FIG. 3, when the mobile device 360 is at a position P1, a distance between the mobile device 360 and the display device 310 is d1 corresponding to the BLE signal receivable range. Thus, when the mobile device 360 transmits a BLE signal, the display device 310 may receive the BLE signal transmitted from the mobile device 360 by scanning for the BLE signal. When the BLE signal is received, the display device 310 may continuously execute the ambient service or may start the ambient service, and may display, on the display, a screen image (e.g., a clock screen image, or the like) corresponding to the ambient service.

Referring to FIG. 3, when the mobile device 360 is at a position P2, a distance between the mobile device 360 and the display device 310 is d2 that exceeds the BLE signal receivable range. Thus, when the mobile device 360 transmits a BLE signal, the display device 310 cannot receive the BLE signal transmitted from the mobile device 360 by scanning for the BLE signal. Therefore, the display device 310 ends executing the ambient service or does not start the ambient service.

FIG. 4 illustrates a display device and a mobile device that are connected via a BLE wireless network, according to an embodiment.

Referring to FIG. 4, the display device 310 according to an embodiment includes a controller 311, a communicator 313, a memory 315, and a display 317.

The mobile device 360 that is connectable to the display device 310 via a BLE communication network 405 includes a controller 361, a communicator 363, and a memory 365.

First, a configuration and operation of the mobile device 360 is described below in detail.

The controller 361 may include at least one processor. The at least one processor may execute at least one instruction to perform a certain operation, the at least one instruction being stored in the memory 365.

In an embodiment, the controller 361 may control a BLE signal to be transmitted. The controller 361 may control the BLE signal to be transmitted in different manners according to an OS of the mobile device 360.

The communicator 363 may include at least one communication module configured to wirelessly communicate with an external electronic device (e.g., the display device 310 or the like) according to predetermined wireless communication protocols. The communicator 363 may include a Bluetooth communication module configured to perform wireless communication according to BLE communication protocols. The Bluetooth communication module may include a BLE module and may transmit or receive a BLE signal.

The communicator 363 may include not only the Bluetooth communication module but may also include a communication module configured to perform wireless communication according to communication protocols including a wireless local area network (LAN), wired Ethernet, or the like. A wireless LAN communication module may include a WiFi communication module configured to perform wireless communication according to WiFi communication protocols.

The communicator 363 may transmit a BLE signal under the control of the controller 361.

The memory 365 may store at least one instruction to be executed by the controller 361 and other data.

In an embodiment, the mobile device 360 may transmit a BLE signal based on a request of the display device 310. As another example, the mobile device 360 may transmit a BLE signal at regular time intervals.

A configuration and operation of the display device 310 according to an embodiment is described below in detail.

The display 317 displays an image under the control of the controller 311. The image may include all data that are visually recognizable to a user. The image may include a moving picture such as broadcasting contents, a screen image of a game, a photo, a clock, or the like. A screen image corresponding to an ambient service may include a famous painting image, a photo, a clock image, a landscape image, or the like.

The memory 315 stores at least one instruction.

The controller 311 includes at least one processor to execute the at least one instruction stored in the memory 315. The at least one processor included in the controller 311 may execute the at least one instruction to perform a certain operation, the at least one instruction being stored in the memory 315.

The communicator 313 may communicate with the mobile device 360 via at least one wireless network including the BLE communication network 405. The communicator 313 may receive a BLE signal via the BLE communication network 405. An operation of receiving or scanning for a BLE signal transmitted from the mobile device 360 is described in detail with reference to FIGS. 11A to 12B.

In an embodiment, a BLE signal may include BLE identification information for identifying the mobile device 360. Hereinafter, it is assumed that the BLE identification information is included in the BLE signal transmitted from the mobile device 360.

In an embodiment, an operation of the display device 310 may include a normal mode and a sleep mode.

The normal mode indicates an operation state in which power is supplied to all elements of the display device 310. Thus, in the normal mode, the display device 310 displays a certain image. The ambient service may be executed in the normal mode, and when it is not the normal mode, the execution of the ambient service may be stopped.

The sleep mode is a mode in which power of the display device 310 is saved and indicates an operation state in which power is supplied to the communicator 313 to exchange a control signal or certain data with an external electronic device (e.g., the mobile device 360, a remote controller, or the like). In the sleep mode, power supply to elements other than the communicator 313 may be blocked. The sleep mode may be referred to as a standby mode or a power-saving mode.

The term 'wake-up' may indicate an operation in which the display device 310 in the sleep mode is activated to start the normal mode. When the display device 310 is in the sleep mode, power supply to the controller 311 is blocked such that the controller 311 does not operate and only the communicator 313 operates because power is supplied only to the communicator 313. In this case, the communicator 313 may transfer a signal for waking up the controller 311 to the controller 311, in response to a scanned for or received BLE signal.

When the BLE identification information for identifying the mobile device 360 connected via the BLE communication network 405 is received from the mobile device 360 in the normal mode in which the ambient service is executed, a processor included in the controller 311 manages the BLE identification information. The term 'manage' may include an operation of receiving, by the controller 311, the BLE identification information and all operations performed by the controller 311 according to whether information corresponding to the BLE identification information is present in the memory 315.

When the BLE identification information is received from the mobile device 360 after the sleep mode starts, the communicator 313 may wake up the processor included in the controller 311, according to a result of determining whether the information corresponding to the BLE identification information is present.

The BLE identification information may be information for identifying the mobile device 360 connected via the BLE communication network 405. That is, the BLE identification information may be the information for identifying the mobile device 360 that has transmitted the BLE signal. The BLE identification information may include a BLE address (e.g., a BLE MAC address).

The BLE identification information may include a random address for decrypting a BLE address by using a predetermined decryption key. For example, when the BLE identification information includes a random address of the mobile device 360, the display device 310 may convert, by using an IRK obtained in BLE pairing, a received random address value to a BLE address that is an original address and has transmitted from the mobile device 360 in BLE pairing.

In addition to the BLE MAC address or alternatively, the BLE identification information may include information for identifying an external electronic device connected via the BLE communication network 405.

Figure 7A:
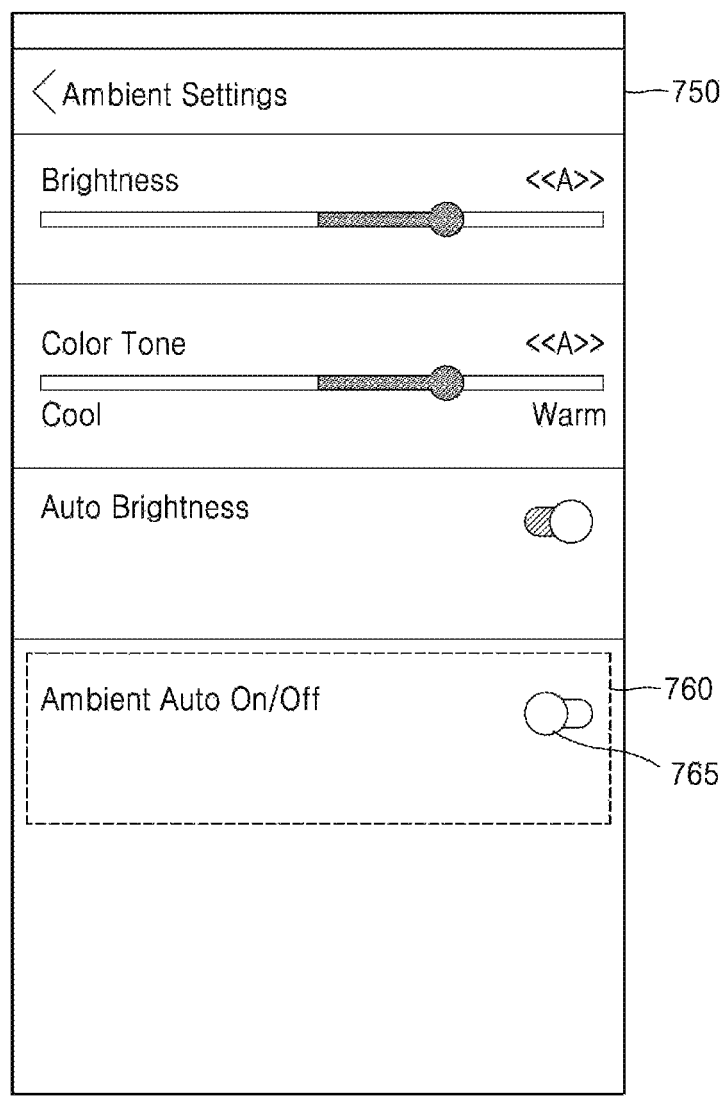
FIG. 7A illustrates a user interface (UI) screen output from a portable device connected to the display device via a BLE network according to an embodiment.
Figure 7B:
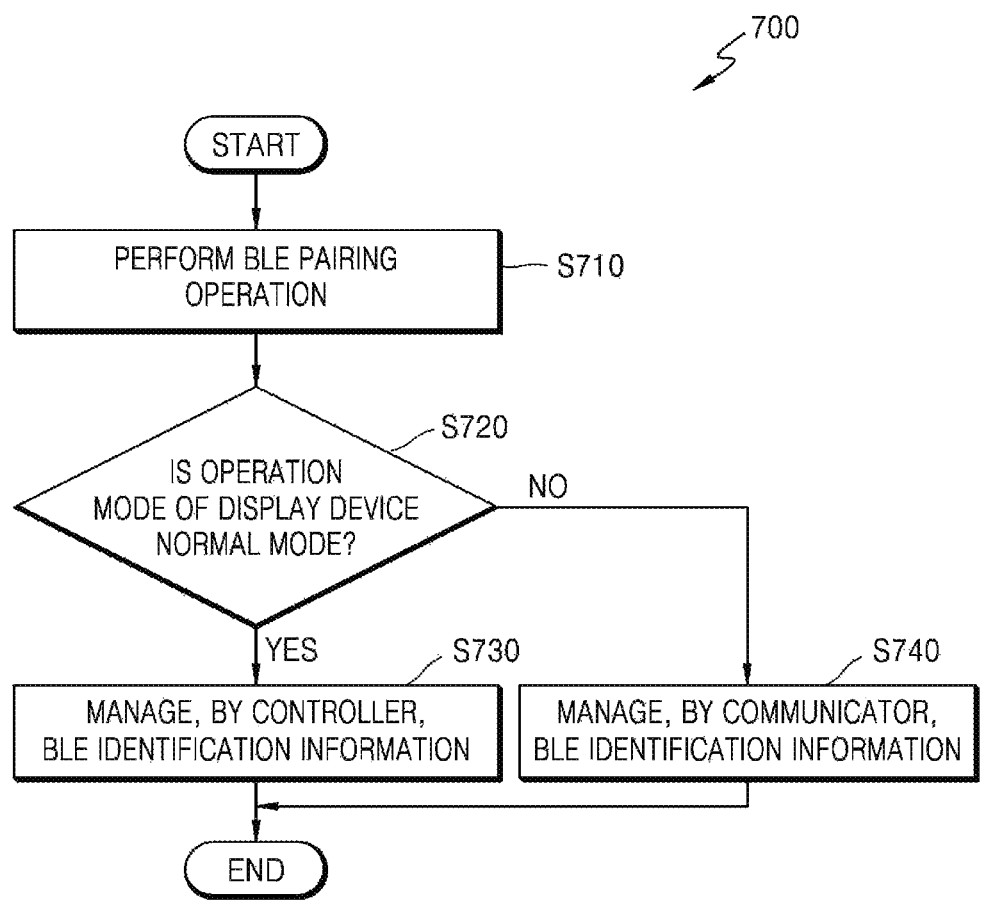
FIG. 7B is a diagram for describing operations performed by the display device, according to an embodiment.

Referring to FIG. 7B, in a method 700, according to whether the display device 310 according to an embodiment is in the normal mode or the sleep mode (operation S720), at least one of the controller 311 or the communicator 313 becomes an operating subject that manages BLE identification information (operation S730 or S740).

When the display device 310 is in the normal mode in which the ambient service is executed, the controller 311 may become the operating subject that manages BLE identification information (operation S730). When the BLE identification information for identifying the mobile device 360 connected via the BLE communication network 405 is received from the mobile device 360 in the normal mode in which the ambient service is executed, the processor included in the controller 311 manages the BLE identification information.

When the display device 310 is in the sleep mode, the communicator 313 may become the operating subject that manages BLE identification information (operation S740). When the BLE identification information is received from the mobile device 360 after the sleep mode starts, the communicator 313 may wake up the processor included in the controller 311, according to a result of determining whether the information corresponding to the BLE identification information is present.

After the sleep mode starts, the communicator 313 may obtain the BLE identification information included in a BLE signal transmitted from the mobile device 360. After the sleep mode starts, the communicator 313 does not transfer the obtained BLE identification information to the controller 311 but autonomously manages the BLE identification information, thereby decreasing power consumption. The communicator 313 may wake up the processor, based on a result of determining whether information corresponding to the obtained BLE identification information is included in a memory in the communicator 313.

The communicator 313 may include an internal memory storing certain data. The internal memory may store BLE identification information of an external electronic device (e.g., the mobile device 360) that is paired with the display device 310. The external electronic device that is paired with the display device 310 may be an electronic device registered in the display device 310. In a pairing or registering operation, the display device 310 may obtain BLE identification information of an external electronic device and may store the BLE identification information in the internal memory of the communicator 313 and the memory 315.

Thus, when information corresponding to the received BLE identification information is present in the internal memory of the communicator 313, the communicator 313 may transmit a wake-up signal to the controller 311 to wake up the processor included in the controller 311. When the information corresponding to the received BLE identification information is not present in the internal memory of the communicator 313, the communicator 313 may allow the processor included in the controller 311 not to wake up such that the sleep mode may be maintained.

For example, it is assumed that a first mobile device has first BLE identification information and a second mobile device has second BLE identification information. The first mobile device is a device that is registered in the display device 310 by performing a pairing operation, and the second mobile device is a device that is not registered in the display device 310.

In this case, when the display device 310 performs the pairing operation with respect to the first mobile device, the display device 310 stores the first BLE identification information in the internal memory of the communicator 313 and the memory 315 referred to by the controller 311. After the pairing operation is performed, when the communicator 313 senses or receives the first BLE identification information, the communicator 313 determines whether information corresponding to the sensed or received first BLE identification information is stored in the internal memory of the communicator 313, thereby determining whether the first mobile device that has transmitted the first BLE identification information is a device registered in the display device 310. In the aforementioned example, because information that corresponds to (i.e., that is equal to) the sensed or received first BLE identification information is stored in the internal memory of the communicator 313, the communicator 313 may transmit a wake-up signal to the processor included in the controller 311 to wake up the controller 311. Also, when the controller 311 wakes up, the controller 311 may recognize that a user is present around the display device 310, thereby controlling the ambient service to be executed.

After the pairing operation is performed, when the communicator 313 senses or receives the second BLE identification information, the communicator 313 determines whether information corresponding to the sensed or received second BLE identification information is stored in the internal memory of the communicator 313, thereby determining whether the second mobile device that has transmitted the second BLE identification information is a device registered in the display device 310. In the aforementioned example, information that corresponds to (i.e., that is equal to) the sensed or received second BLE identification information is not stored in the internal memory of the communicator 313. Thus, the communicator 313 may determine that the second mobile device is not a device registered in the display device 310, thereby operating not to wake up the controller 311 and operating to make the sleep mode maintained. That is, the sensed or received second BLE identification information may be ignored, and the sleep mode may be maintained.

As described above, the display device 310 according to an embodiment allows the communicator 313 to be a subject that manages BLE identification information before the display device 310 wakes up, so that it is possible to prevent that the display device 310 unnecessarily wakes up. Therefore, when BLE identification information is received or sensed, power consumed to determine whether an external electronic apparatus that has transmitted the BLE identification information is a registered device and to perform a subsequent operation (e.g., to perform a wake-up operation, to maintain a sleep mode, or the like) may be minimized.

Figure 5:
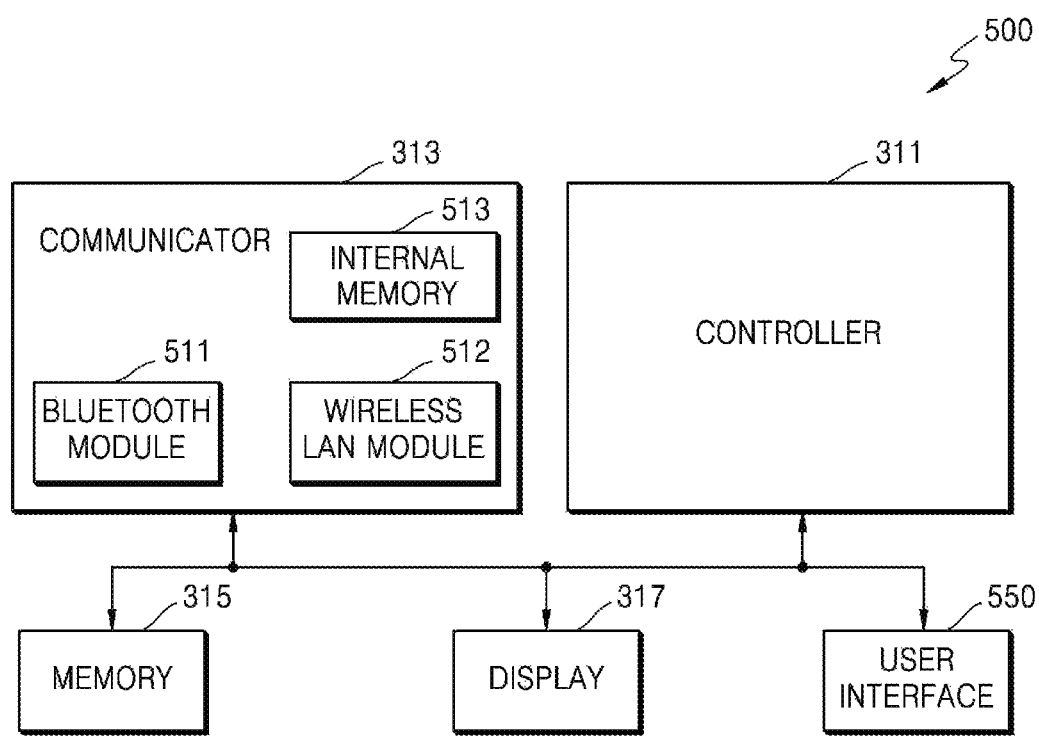
FIG. 5 is a block diagram illustrating a display device according to an embodiment.

FIG. 5 is a block diagram illustrating a display device 500 according to an embodiment. The display device 500 may correspond to any one of the display devices 160, 210, and 310.

Referring to FIG. 5, the display device 500 includes the controller 311, the communicator 313, the memory 315, the display 317, and a UI 550. The display device 500 may communicate with the mobile device 360 via a BLE communication network (e.g., the BLE communication network 405 of FIG. 4).

The display 317 displays an image under the control of the controller 311. The display 317 may display a screen image corresponding to an ambient service while the ambient service is being executed. The screen image corresponding to the ambient service may include a famous painting image, a photo, a clock image, a landscape image, or the like.

When the display 317 is turned off, a screen of the display 317 may turn black. Also, when the display 317 is turned on, that is, when the display device 500 is in a normal mode, the display 317 may display a screen image corresponding to certain contents. As another example, when the ambient service is executed after the display 317 is turned on, the display 317 may display a screen image corresponding to the ambient service.

The memory 315 stores at least one instruction.

The controller 311 includes at least one processor configured to execute the at least one instruction stored in the memory 315. The at least one processor included in the controller 311 may execute the at least one instruction to perform a certain operation, the at least one instruction being stored in the memory 315.

The controller 311 may include a memory and at least one processor, the memory storing at least one program to perform the aforementioned operation and operations to be described below, and the at least one processor executing the stored at least one program. The memory included in the controller 311 may correspond to the memory 315, and may store the at least one instruction. As another example, the controller 311 does not include the memory, and only the memory 315 may be arranged to store the at least one program.

The controller 311 may include a random access memory (RAM) that stores a signal or data input from an external source of the display device 500 or is used as a storage region corresponding to various tasks performed in the display device 500, a read-only memory (ROM) that stores a control program for controlling the display device 500, and the at least one processor. The RAM may include all memories capable of writing and reading information or amending written information, and may be referred to as a volatile memory. The ROM may include a memory capable of only reading written information and not capable of amending information, and may be referred to as a non-volatile memory. The RAM and the ROM described to be included in the controller 311 may be included in the memory 315.

The memory 315 may include a storage medium of at least one type of a flash memory, a hard disk, a multimedia card type memory, a card type memory such as a secure digital (SD) or xD-Picture (xD) card memory, a RAM, a static random access memory (SRAM), a ROM, an electrically erasable programmable read-only memory (EEPROM), a programmable read-only memory (PROM), a magnetic memory, a magnetic disc, or an optical disc.

An internal configuration of the controller 361 of the mobile device 360 described with reference to FIG. 4 may equally correspond to the aforementioned detailed configuration of the controller 311.

The memory 365 of the mobile device 360 may equally correspond to the aforementioned detailed configuration of the memory 315.

The processor included in the controller 311 may include a graphics processing unit (GPU) for processing graphics corresponding to a video.

The processor included in the controller 311 may be implemented as a system on chip (SoC) in which a core processor and the GPU are integrated. The processor may include a single-core processor, a dual-core processor, a triple-core processor, a quadruple-core processor, or a multiple-core processor.

The communicator 313 may communicate with the mobile device 360 via at least one wireless network including the BLE communication network 405. The communicator 313 may receive a BLE signal via the BLE communication network 405.

The communicator 313 may include at least one communication module capable of performing wireless communication. The communication module included in the communicator 313 may include a Bluetooth module 511 and a wireless LAN module 512. The communicator 313 may include an internal memory 513.

The Bluetooth module 511 receives a Bluetooth signal transmitted from an external electronic device such as the display device 210 according to a Bluetooth communication standard. The Bluetooth module 511 may be a BLE module and may receive a BLE signal.

The Bluetooth module 511 may constantly or temporarily scan for a BLE signal to detect whether the BLE signal is received.

The communicator 313 may include the wireless LAN module 512. The wireless LAN module 512 may receive a WiFi signal transmitted from the display device 210 according to a WiFi communication standard.

In addition to the shown Bluetooth module 511 and wireless LAN module 512 or alternatively, the communicator 313 may include at least one wireless communication module capable of transceiving different wireless signals.

Hereinafter, it is assumed that the communicator 313 is provided as a BLE module and receives a BLE signal.

In an embodiment, the communicator 313 may internally include the internal memory 513. The internal memory 513 may store BLE identification information included in a BLE signal received via the Bluetooth module 511. The internal memory 513 may store a plurality of items of data required for the communicator 313 to wirelessly communicate with an external electronic device, e.g., the mobile device 360. For example, when the display device 500 is connected to the mobile device 360 via a Bluetooth communication network, the display device 500 may receive a Bluetooth MAC address of the mobile device 360 and may perform a pairing operation with the mobile device 360. Then, the internal memory 513 may store the Bluetooth MAC address received from the mobile device 360.

The display 317 outputs a video signal such as a screen image via which a user may visually recognize certain information.

The UI 550 may receive a user input for controlling the display device 500. The UI 550 may include, but is not limited to, a touch panel for sensing a user's touch, a button for receiving user's push manipulation, a wheel for receiving user's wheel manipulation, and a user input device including a keyboard, a dome switch, or the like.

In an embodiment, when a UI screen for pairing with and/or registering the mobile device 360 is output under the control of the controller 311, a user may input, via the UI 550, data and/or a command for registering the mobile device 360. Then, the controller 311 may perform, based on the user input, a pairing operation and/or a registering operation on the mobile device 360.

Figure 6:
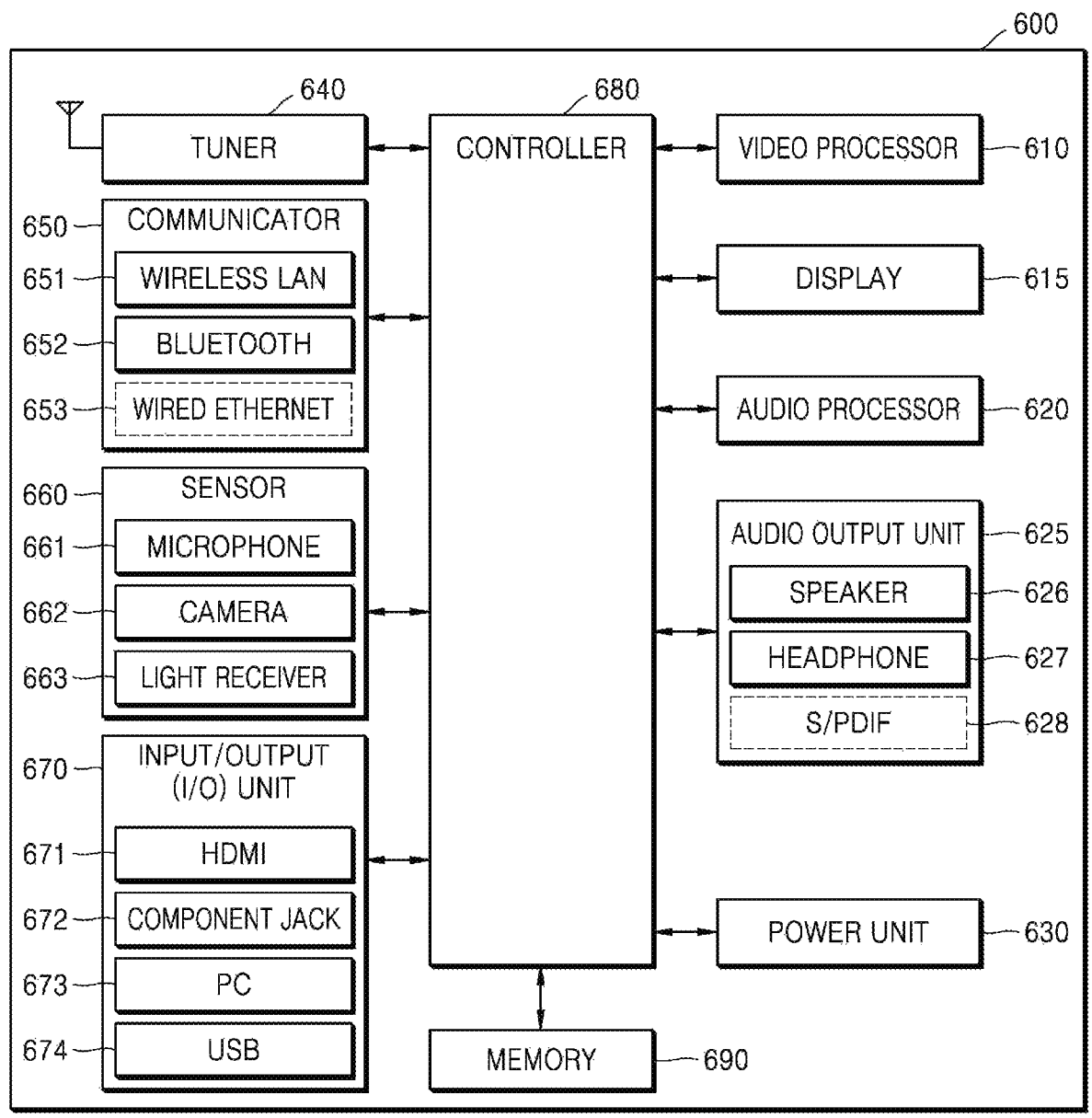
FIG. 6 is a block diagram illustrating a display device according to an embodiment.

FIG. 6 is a block diagram illustrating a display device 600 according to an embodiment.

The display device 600 according to an embodiment may equally correspond to the display device 160, 210, 310, and 500 and may be a display device that receives a BLE signal that is a wireless signal.

Referring to FIG. 6, the display device 600 includes a video processor 610, a display 615, an audio processor 620, an audio output unit 625, a power unit 630, a tuner or tuners 640, a communicator 650, a sensor 660, an input/output (I/O) unit 670, a controller 680, and a memory 690.

The controller 680 may correspond to the controller 311 of the display device 500 shown in FIG. 5. The communicator 313, the Bluetooth module 511, the wireless LAN module 512, the display 317, and the memory 315 shown in FIG. 5 may respectively correspond to the communicator 650, a Bluetooth module 652, a wireless LAN module 651, the display 615, and the memory 690 of the display device 600 shown in FIG. 6. The video processor 610 may perform processing on video data that is received by the display device 600. The video processor 610 may perform various image processing on the video data, such as decoding, scaling, noise filtering, frame rate conversion, resolution conversion, or the like.

The controller 680 may receive a recording request with respect to the video data processed by the video processor 610, and may control the video data to be encrypted and recorded on a memory device, e.g., a RAM, included in the controller 680 or the memory 690.

The display 615 may display, on a screen, a video included in a broadcasting signal received via the tuner 640 under the control of the controller 680. The display 615 may display content (for example, a video) input via the communicator 650 or the I/O unit 670.

The display 615 may output an image stored to the memory 690 under the control of the controller 680. The display 615 may display a sound UI (for example, including a guide of sound instructions) for performing a sound recognition task corresponding to sound recognition, or a motion UI (for example, including a guide of user motion for motion recognition) for performing a motion recognition task corresponding to motion recognition.

The audio processor 620 may perform processing on audio data. The audio processor 620 may perform various processing on the audio data, such as decoding, amplification, noise filtering, or the like. The audio processor 620 may include a plurality of audio processing modules to process audios corresponding to a plurality of pieces of content.

The audio output unit 625 may output an audio included in the broadcasting signal received via the tuner 640 under the control of the controller 680. The audio output unit 625 may output an audio (for example, a voice, sound, etc.) input via the communicator 650 or the I/O unit 670. The audio output unit 625 may output an audio stored to the memory 690, under the control of the controller 680. The audio output unit 625 may include at least one of a speaker 626, a headphone output terminal 627, or a Sony/Philips digital interface (S/PDIF) 628. The audio output unit 625 may include a combination of the speaker 626, the headphone output terminal 627, and the S/PDIF 628.

In an embodiment, the speaker 626 may output a sound wave signal. The speaker 626 may output an ultrasound signal.

The power unit 630 supplies, under the control of the controller 680, power from an external power source to internal elements of the display device 600. Also, the power unit 630 may supply, under the control of the controller 680, power from one or more batteries provided in the display device 600 to the internal elements of the display device 600.

The tuner 640 may tune and select only a frequency of a channel that is to be received by the display device 600, among many radio wave components, based on amplification, mixing, resonance, or the like with respect to a broadcasting signal received in a wireless or wired manner. The broadcasting signal may include an audio, a video, and additional information (for example, an electronic program guide (EPG)).

The tuner 640 may receive the broadcasting signal at a frequency bandwidth corresponding to a channel number (for example, a cable broadcasting number 506), based on a user input (for example, a control signal such as an input of a channel number, an input of channel up-down, or an input of a channel on an EPG screen, which is received from an external controller, e.g., a remote controller).

The tuner 640 may receive the broadcasting signal from various sources, such as ground-wave broadcasting, cable broadcasting, satellite broadcasting, Internet broadcasting, or the like. The tuner 640 may receive the broadcasting signal from a source, such as analogue broadcasting or digital broadcasting. The broadcasting signal received via the tuner 640 may be decoded (for example, audio decoding, video decoding, or additional information decoding) and then separated into an audio, a video, and/or additional information. The separated audio, video, and/or additional information may be stored in the memory 690 under the control of the controller 680.

When the display device 600 includes the tuners 640 according to an embodiment, a plurality of broadcasting signals may be output to a plurality of windows of a multi-window screen provided to the display 615.

The tuner 640 may be implemented as all-in-one by being included in the display device 600, or the tuner 640 may be implemented as a separate device (for example, a set-top box) that has a tuner and is electrically connected to the display device 600. As another example, the tuner 640 may be implemented to be connected to the I/O unit 670.

The communicator 650 may connect the display device 600 to an external device (for example, an audio device, etc.) under the control of the controller 680. The controller 680 may transmit/receive content to/from the external device connected to the display device 600 via the communicator 650, may download an application from the external device, or may perform web-browsing. The communicator 650 may access a network and may receive content from the external device.

As described above, the communicator 650 may include at least one of a short-range communication module, a wired communication module, or a mobile communication module.

FIG. 6 illustrates an example in which the communicator 650 includes a communication module, e.g., the wireless LAN module 651, the Bluetooth module 652, and wired Ethernet 653.

The communicator 650 may include a combination of the wireless LAN 651, the Bluetooth 652, and wired Ethernet 653. The communicator 650 may receive a control signal of a control device under the control of the controller 680. The control signal may be implemented as a Bluetooth type control signal, a radio frequency (RF) signal type control signal, or a WiFi type control signal.

In an embodiment, the Bluetooth 652 may transmit or receive a BLE signal according to a BLE communication standard.

The communicator 650 may include, in addition to the Bluetooth 652 or alternately, another short-range communication module (e.g., a near field communication (NFC) module), a BLE module, or the like.

The sensor 660 senses a user's voice, a user's image, or user's interaction.

A microphone 661 may receive an uttered voice of a user. The microphone 661 may convert the received voice into an electrical signal and may output the electrical signal to the controller 680. The user's voice may include, for example, a voice corresponding to a menu or a function of the display device 600. For example, a recognition range of the microphone 661 may be within 4 meters (m) from the microphone 661 to a location of the user. The recognition range of the microphone 661 may vary according to a sound level of the voice of the user and ambient environments (e.g., speaker sound, ambient noise, or the like).

The microphone 661 may be integrated in the display device 600 or may be separate from the display device 600. The separate microphone 661 may be electrically connected to the display device 600 via the communicator 650 or the I/O unit 670.

In an embodiment, the microphone 661 may receive a sound wave signal in addition to the voice of the user or alternatively thereto. The microphone 661 may receive an ultrasound signal.

However, the microphone 661 may be excluded from the display device 600 based on functions and a structure of the display device 600.

A camera or cameras 662 may receive an image (for example, consecutive frames) corresponding to motion of the user, the motion including a gesture within a camera recognition range. For example, a recognition range of the camera 662 may be a distance between about 0.1 m and about 5 m from the camera 662 to the user. The motion of the user may include a motion by a user's body part such as a face, a facial expression, a hand, a fist, fingers, or the like. The camera 662 may convert the received image into an electrical signal and may output the electrical signal to the controller 680, under the control of the controller 680.

The controller 680 may select a menu displayed on the display device 600 based on a result of received motion recognition, or may perform a control operation corresponding to the result of the motion recognition. For example, the control operation may include channel adjustment, volume adjustment, indicator movement, or the like.

The camera 662 may include a lens and an image sensor. The camera 662 may support an optical zooming function or a digital zooming function by using a plurality of lenses and image processing. A recognition range of the camera 662 may be variously set according to angles of the camera 662 and surrounding environment conditions. When a plurality of the cameras 662 are arranged, a three-dimensional (3D) still image or 3D motion may be received by using the plurality of cameras 662.

The camera 662 may be integrated in the display device 600 or may be separate from the display device 600. A separate device including the camera 662 may be electrically connected to the display device 600 via the communicator 650 or the I/O unit 670.

However, the camera 662 may be excluded from the display device 600 based on functions and a structure of the display device 600.

A light receiver 663 may receive a light signal (including a control signal) received from the external control device via an optical window of a bezel of the display 615. The light receiver 663 may receive, from the external control device, the light signal corresponding to a user input (for example, a touch operation, a press operation, a touch gesture, a voice, or a motion). The control signal may be extracted from the received light signal, under the control of the controller 680.

For example, the light receiver 663 may receive a signal corresponding to a pointing position of a control device, and may transmit the signal to the controller 680. For example, in a case where a UI screen for receiving data or a command from a user is input via the display 615, and the user attempts to input data or a command to the display device 600 by using the control device, when the user moves the control device while a finger of the user contacts a touchpad arranged at the control device, the light receiver 663 may receive a signal corresponding to movement of the control device and may transmit the signal to the controller 680. The light receiver 663 may receive a signal indicating that a particular button of the control device has been pressed and may transmit the signal to the controller 680. For example, when the user presses, by using a finger, a button-type touchpad arranged at the control device, the light receiver 663 may receive a signal indicating that the button-type touchpad has been pressed and may transmit the signal to the controller 680. For example, the signal indicating that the button-type touchpad has been pressed may be used as a signal for selecting one of items.

The I/O unit 670 may receive a video (for example, a moving picture, or the like), an audio (for example, a voice, music, etc.), additional information (for example, EPG, or the like), or the like, from an external source of the display device 600 under the control of the controller 680. The I/O unit 670 may include one of a high-definition multimedia interface (HDMI) port 671, a component jack 672, a PC port 673, and a universal serial bus (USB) port 674. The I/O unit 670 may include a combination of the HDMI port 671, the component jack 672, the PC port 673, and the USB port 674.

A configuration and operations of the I/O unit 670 may be variously embodied according to embodiments of the disclosure.

The controller 680 may control general operations of the display device 600 and signal flows among components included in the display device 600, and may process data. When there is a user input or when a stored predetermined condition is satisfied, the controller 680 may execute an OS and various applications stored in the memory 690.

The controller 680 may include RAM configured to store a signal or data which is input from the outside of the display device 600 or used as a storage area corresponding to various operations performed in the display device 600, ROM in which a control program for controlling the display device 600 is stored, and a processor.

The processor may include a GPU for processing graphics corresponding to a video. The processor may be implemented as a SoC in which a core processor and the GPU are integrated. The processor may include a single-core processor, a dual-core processor, a triple-core processor, a quadruple-core processor, or a multiple-core processor.

The processor may include a plurality of processors. For example, the processor may be implemented as a main processor and a sub processor that operates in a sleep mode.

A graphic processor may generate a screen image including various objects, such as icons, images, text, etc. by using a calculator and a renderer. The calculator may calculate a coordinate value on which each object is to be displayed based on a layout of a screen, and an attribute value of the object, such as a shape, a size, a color, etc., by using user's interaction sensed via the sensor 660. The renderer may generate screen images of various layouts including the object, based on the attribute value calculated by the calculator. The screen image generated by the renderer may be displayed on a display area of the display 615.

FIG. 7A illustrates a UI screen output from a portable device, e.g., the mobile device 360, connected to the display device 500 via a BLE network according to an embodiment.

In an embodiment, an ambient service may be executed in a program or an application installed in the mobile device 360. The application for executing the ambient service may be distributed through an application store that is connectable and usable through the mobile device 360. The application store indicates a server that distributes, sells, or provides applications, in which users of portable devices having a certain OS (e.g., Android OS) may purchase the applications. A user of the mobile device 360 may access the application store and may download the application for executing the ambient service, the application being provided through the application store. Accordingly, the application for executing the ambient service may be installed in the controller 361 or the memory 365 of the mobile device 360.

The application for executing the ambient service may be developed by a manufacturer of the display device 500, a seller of the display device 500, a developer of an application that is usable being associated with the display device 500, or the like.

In an embodiment, the manufacturer of the display device 500 may develop and provide an application to the application store, the application being for executing and controlling an ambient service that is executable in the display device 500. Hereinafter, for convenience of description, the application for executing and controlling an ambient service is referred to as "the ambient application". Then, a user of the mobile device 360 attempting to control, by using the mobile device 360, an ambient service that is executable in the display device 500 may access the application store and download the ambient application by using the communicator 363 of the mobile device 360. The mobile device 360 may download, store, and execute the ambient application, in response to a user input.

With reference to the mobile device 360 and the display device 310 of FIG. 3, operations of the display device 310 to execute the ambient service are described in detail below with reference to FIGS. 7A to 12A.

FIG. 7A illustrates an example of an execution window 750 of an ambient application. The execution window 750 may correspond to a UI screen for controlling an ambient service.

Referring to FIG. 7A, the execution window 750 of the ambient application may include a menu window 760 for setting whether to execute the ambient service. A user may set whether to execute the ambient service by manipulating a slide key 765 of the menu window 760. For example, the user may toggle the slide key 765 to the left to allow the ambient service to be automatically executed, or may toggle the slide key 765 to the right to end the ambient service. The user who manipulates the menu window 760 may be one of members of a family in the house 100 (see FIG. 1), and may attempt to control the ambient service that is executable in a display device by using user's mobile device 360.

A mode in which the ambient service is automatically executed is referred to as an 'ambient auto-on mode', and a mode in which the ambient service is not executed is referred to as an 'ambient auto-off mode'. In the ambient auto-on mode, the mobile device 360 may be set to transmit a BLE signal to use and/or execute a TV ambient service. In the ambient auto-off mode, the mobile device 360 does not transmit a BLE signal and thus the user does not use the TV ambient service.

In the ambient auto-on mode, the display device 500 may automatically maintain, stop, or resume execution of the ambient service, according to whether a BLE signal is received or scanned for.

The display device 500 according to an embodiment may perform registration or pairing on the mobile device 360 before the display device 500 executes the ambient service.

In TV-mobile device link where the display device 500 such as a TV is linked with the mobile device 360, when the display device 500 to which the mobile device 360 attempts to be linked is searched for and selected, an execution window 750 that is a UI screen for selecting BLE Ambient On or Off is activated.

An operation of searching for, selecting, and/or registering the display device 500 may be referred to as a "pairing operation".

The pairing operation may be performed by using one of communication networks. For example, the pairing operation may be performed via a general Bluetooth communication network instead of a BLE communication network.

In an embodiment, it is assumed that two devices that are linked with each other are registered in a same account (e.g., a Samsung account). When the mobile device 360 searches for a certain TV that is the display device 500 in a certain application, e.g., Samsung Connect App, and performs an Add Device operation, the two devices are linked in a same account. After the devices are linked in the same account, a user may select a corresponding device (i.e., the TV) from a UI screen such as IoT Dashboard showing a list of registered devices. Then, the mobile device 360 may output the UI screen including the menu window 760 that is an Ambient On/Off menu as a sub item.

Referring again to FIG. 7B, when an ambient service becomes active in the menu window 760, the mobile device 360 and the display device 310 perform a BLE pairing operation (operation S710). The BLE pairing operation is an operation different from the pairing operation of searching for, selecting, and/or registering the display device 310, and indicates a procedure of pairing between devices that are connectable via a BLE communication network.

After the BLE pairing is performed, even when a BLE address of the mobile device 360 is randomly changed, the display device 310 may determine whether a connected device is the registered mobile device 360 that was BLE-paired.

Figure 8:
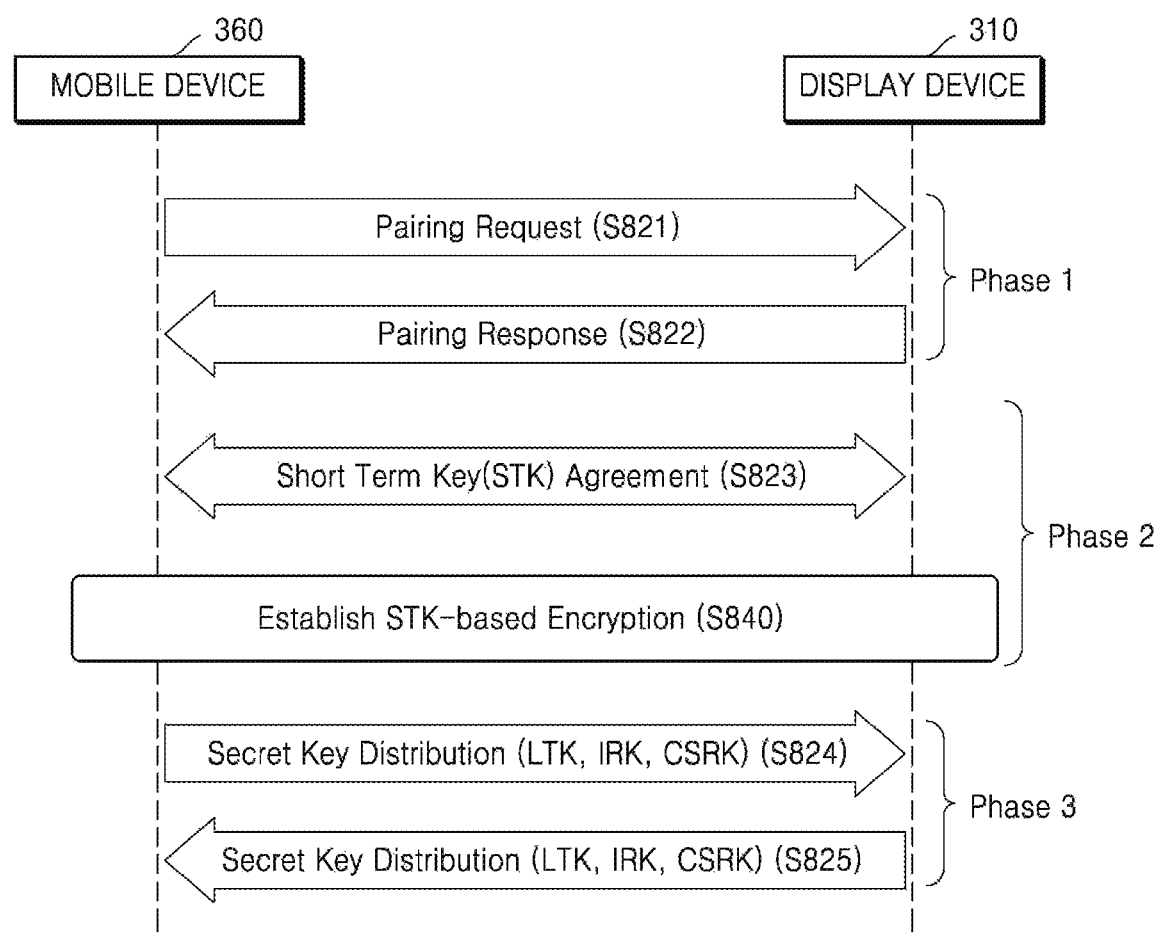
FIG. 8 is a diagram for describing a pairing operation performed by the display device, according to an embodiment.

The BLE pairing (operation S710) is described in detail below with reference to FIG. 8.

The BLE pairing may be divided into Phase 1 (operations S821 and S822) that involves requesting, Phase 2 (operation S823) that involves key agreement, and Phase 3 (operations S824 and S825) that involves key distribution.

In Phase 1 of the BLE pairing, a pairing request and a response therefor are performed. The mobile device 360 may transmit a signal of requesting pairing to the display device 310 (operation S821), and the display device 310 may transmit a response of allowing pairing to the mobile device 360, in response to the request (operation S822).

In Phase 2, a secure channel is generated to maintain security. In detail, in Phase 2, a short-term key (STK) is generated between the mobile device 360 and the display device 310 and thus a secure channel to be temporarily used is generated (operation S840).

In Phase 3, secret keys to be used in BLE pairing are shared. An IRK may be exchanged to be used in converting a random address to a BLE address, the random address being transmitted by the mobile device 360 after BLE pairing is performed, and the BLE address being an original address that has transmitted in the BLE pairing. When keys that are a long-term key (LTK), an IRK, and a connection signature resolving key (CSRK) for the BLE pairing are shared, the BLE pairing is completed. A plurality of pieces of information, e.g., the BLE address, the keys (the LTK, the IRK, and the CSRK), or the like which are transmitted in the BLE pairing may be stored in an internal memory (see the internal memory 513 of FIG. 5) of the communicator 313.

In detail, in Phase 1, when the mobile device 360 transmits the signal of requesting pairing to the display device 310 (operation S821), the mobile device 360 may transmit, to the display device 310, the BLE address for identifying a device that transmits a BLE signal. The BLE address may include a unique value for identifying the mobile device 360 to allow the display device 310 to recognize a source of the BLE signal transmitted by the mobile device 360. The BLE address may be information for identifying the mobile device 360 connected to the display device 310 via the BLE communication network. For example, the BLE address may include a BLE MAC address of the mobile device 360. Thus, the BLE address may be interpreted to have the same meaning as BLE identification information, and thus may also be referred to as the BLE identification information.

The pairing operation described with reference to FIG. 8 conforms to a Bluetooth communication standard. Also, in an embodiment, for security, the mobile device 360 and the display device 310 may perform the pairing operation described with reference to FIG. 8 to be paired, but one of pairing methods according to the related art may be used.

During a pairing operation between two devices, the two devices share information with each other. The mobile device 360 may transmit information about its own OS type (e.g., Android, iOS, or the like) to the display device 310.

In an embodiment, the display device 310 that is a receiving terminal stores the BLE address of the mobile device 360 in the BLE pairing, and uses the BLE address to identify a packet (e.g., a BLE packet) including a random BLE address that is a random address transmitted at a later time.

FIG. 9 is a diagram for describing operations performed by the display device 310, according to an embodiment.

In an embodiment, according to whether the display device 310 is in a normal mode or a sleep mode, at least one of the controller 311 or the communicator 313 may become an operating subject that manages BLE identification information.

Referring to FIG. 9, block 901 indicates an operation of the display device 310 in the normal mode in which an ambient service is executed. A block 902 indicates an operation of the display device 310 after the sleep mode of the display device 310 starts.

In an embodiment, the display device 310 performs the operation of block 901 during the normal mode in which the ambient service is executed, and after the sleep mode is started, the display device 310 performs the operation of block 902. In FIG. 9, block 901 and block 902 are distinguished and described to differ the operation in the normal mode from the operation in the sleep mode. Therefore, although FIG. 9 illustrates that block 901 is first performed and then block 902 is performed, but block 902 may be first performed and then block 901 may be performed.

In an embodiment, the display device 310 may maintain or stop execution of the ambient service according to whether a user is present nearby. To determine whether the user is present around the display device 310, the display device 310 may determine whether the registered mobile device 360 is present around the display device 310. To determine whether the registered mobile device 360 is present around the display device 310, the display device 310 uses a BLE signal transmitted from the mobile device 360. That is, when the display device 310 senses the BLE signal transmitted from the mobile device 360, the display device may determine that the registered mobile device 360 is present around the display device 310. When the display device 310 does not sense the BLE signal transmitted from the mobile device 360, the display device may determine that the registered mobile device 360 is not present around the display device 310. Accordingly, the display device 310 recognizes that the user is not present nearby, and, when the ambient service has been being executed, the display device 310 may end the ambient service and may start the sleep mode. As another example, when the sleep mode has been already begun, the display device 310 may maintain the sleep mode.

With reference to block 901, the operation of the display device 310 in the normal mode in which the ambient service is executed is described below.

Referring to FIG. 9, the mobile device 360 may transmit a BLE signal. In this regard, because the BLE signal includes BLE identification information that is information for identifying the mobile device 360 transmitted the BLE signal, FIG. 9 illustrates that the BLE identification information is transmitted (operation S911). Also, because the BLE signal is BLE packet, hereinafter, the BLE signal and the BLE packet may be used to mean the same.

In this regard, 'transmission of a BLE signal' by the mobile device 360 or 'the transmitted BLE signal' may be referred to as 'BLE Advertisement'. That is, operation S911 illustrated in FIG. 9 may correspond to a BLE advertising operation. After the pairing operation described with reference to FIG. 8 is completed, the mobile device 360 transmits a BLE signal including a random BLE address. Then, the display device 310 may convert the received random BLE address into a BLE address by using the IRK received in previous operation S824 and may recognize the BLE address transmitted in operation S821 that occurs in initial BLE pairing.

When the mobile device 360 transmits the BLE advertisement including the random BLE address in a periodic manner, e.g., every 15 minutes, the display device 310 that is the receiving terminal may convert and/or recognize the random BLE address as the BLE address by using the IRK, the BLE address having been transmitted in the initial BLE pairing.

Here, the mobile device 360 may generate a random BLE address that is randomly changed, for privacy, according to the Bluetooth communication standard in a periodic manner, e.g., every 15 minutes, and may transmit a BLE packet. The random BLE address may be referred to as a private address.

When the display device 310 that is the receiving terminal receives the BLE packet including the random BLE address, the display device 310 may convert the random BLE address into the BLE address of the mobile device 360, the BLE address having been received and stored in the initial BLE pairing, by performing an internal calculation by using the received random BLE address and the IRK stored in the internal memory 513 (see FIG. 5) of the communicator 313.

Management of a private address and address recognition using an IRK may conform to the Bluetooth communication standard. Also, storing and managing of a BLE address received and registered in BLE pairing may be differently implemented in systems/applications.

According to implementation of the mobile device 360, management of BLE advertisement may be performed in two schemes. The first scheme corresponds to a method of constantly transmitting BLE advertisement, the transmitting being performed by the mobile device 360, and the second scheme corresponds to a method of transmitting BLE advertisement in response to a request by the display device 310 that is the receiving terminal.

In the second scheme, the display device 310 that is the receiving terminal may request a BLE packet from the mobile device 360 that is a transmitting terminal. In order for the mobile device 360 to check the request by the display device 310 that is the receiving terminal, the mobile device 360 has to periodically perform a BLE scanning operation. The BLE scanning operation may indicate an operation, performed by the mobile device 360, of sensing whether a signal of requesting the BLE packet is received from the display device 310.

As described above, in transmission and reception of a BLE signal, the mobile device 360 has to constantly or periodically perform a BLE scanning operation and/or a BLE advertising operation. The BLE scanning operation and the BLE advertising operation may be performed by using a scheme requiring lower power consumption. For example, for the mobile device 360 of which OS confirms to an Android scheme, the BLE advertising operation may be always selected. Hereinafter, for convenience of descriptions, the mobile device 360 conforming to the Android scheme is referred to as the Android terminal.

In detail, for an iPhone of which OS confirms to an iOS scheme, the BLE advertising operation may be selected only in response to a request from the display device 310 that is the receiving terminal. For example, when at least one Android terminal is registered in the display device 310 that is the receiving terminal, the display device 310 operates provided that the Android terminal always performs an advertising operation. Also, when at least one iPhone is registered in the display device 310 that is the receiving terminal, the display device 310 transmits an iBeacon signal that is a signal of requesting BLE advertisement, and waits for a response from the iPhone.

When an Android terminal and an iPhone are simultaneously registered in the display device 310, the aforementioned operations may simultaneously proceed. An operation of scanning for BLE Advertisement of the Android terminal and an operation of transmitting an iBeacon signal to the iPhone, the operations being performed by the display device 310, may be performed when an ambient mode for using an ambient service is set to be active in the mobile device 360. When the number of registered Android terminals is 0, the BLE scanning operation is not performed, and when the number of registered iPhones is 0, the operation of transmitting an iBeacon signal is not performed.

When the mobile device 360 performs a BLE advertising operation of transmitting a BLE packet (or a BLE signal) including BLE identification information (operation S911), the display device 310 may receive the BLE packet (or the BLE signal) including the BLE identification information (operation S912). The communicator 313 of the display device 310 receives the BLE packet including the BLE identification information (operation S912). Here, the BLE identification information includes information for identifying the mobile device 360 connected via a BLE communication network. Therefore, when BLE identification information is recognized, it is possible to determine which mobile device is connected via the BLE communication network.

Referring to block 901 of FIG. 9, when BLE identification information is received from a mobile device in a normal mode in which an ambient service is executed, the BLE identification information being for identifying the mobile device connected via the BLE communication network, the processor included in the controller 311 manages the BLE identification information.

When the communicator 313 of the display device 310 receives the BLE identification information in the normal mode in which the ambient service is executed (operation S912), the communicator 313 transmits the received BLE identification information to the controller 311 to make the controller 311 manage the BLE identification information (operation S913). Then, the controller 311 manages the BLE identification information. In this regard, management of the BLE identification information may include all operations for controlling certain operations to be performed based on the BLE identification information.

The processor of the controller 311 may determine whether the mobile device 360 that has transmitted the BLE identification information is registered, based on the BLE identification information (operation S914). In detail, in the BLE pairing operation, the display device 310 registers the paired mobile device 360 by receiving and storing the BLE identification information of the mobile device 360. Therefore, when information corresponding to the BLE identification information, i.e., the information being equal to the BLE identification information, is present in the memory 315 of the display device 310, the display device 310 may determine that the mobile device 360 transmitted the BLE identification information is a registered device.

The processor included in the controller 311 may determine whether the information corresponding to the BLE identification information is stored in the controller 311 of the display device 310 or in the memory 315 referred to by the controller 311, and thus may determine whether the mobile device 360 is registered (operation S914).

Afterward, the processor included in the controller 311 may perform a sequential operation according to a result of determining registration (operation S915).

The sequential operation of S915 may be performed as below.

When the processor included in the controller 311, determines that the mobile device 360 transmitted the BLE identification information is the registered device, the processor may maintain execution of the ambient service that is currently being executed. The fact that the display device 310 has received the BLE identification information transmitted by the mobile device 360 registered in the display device 310 means that the mobile device 360 is located around the display device 310. Also, the fact that the registered mobile device 360 is located around the display device 310 may be interpreted that a user possessing the registered mobile device 360 is located around the display device 310. Therefore, the display device 310 may maintain execution of the ambient service such that the ambient service may be continuously provided to the user.

When the processor included in the controller 311, determines that the mobile device 360 transmitted the BLE identification information is not the registered device, the processor may end execution of the ambient service that is currently being executed.

Even when the display device 310 receives BLE identification information, when the received BLE identification information has been transmitted from an unregistered mobile device, the display device 310 may determine that a user to whom the ambient service is to be provided, i.e., the user of the registered mobile device 360, is not around the display device 310. Therefore, to prevent power consumption, the controller 311 of the display device 310 may perform an operation of ending execution of the ambient service.

The controller 311 may control the display 317 to display a notification message such as 'Ambient service is now being ended' or 'Ambient service will now be ended. Please press a confirm button when you want to maintain execution'. Afterward, when a user does not press the confirm button, the controller 311 may end the ambient service and may control the display device 310 to end the normal mode and start the sleep mode. When a user input is not sensed for a predetermined time period, the controller 311 may control the display device 310 to end the normal mode and start the sleep mode.

As described above, when the controller 311 determines that the BLE identification information is not received from the registered mobile device 360, the display device 310 may start the sleep mode (operation S916). The controller 311 may notify the communicator 313 of the start of the sleep mode (operation S917), and may control power not to be supplied to elements of the display device 310 other than the communicator 313. Accordingly, the display device 310 starts the sleep mode in which only the communicator 313 remains activated.

The memory 315 of the display device 310 may include a first memory and a second memory. The first memory may be a ROM or flash memory storage medium, and the second memory may be a RAM storage medium.

When BLE identification information is received from a mobile device during the normal mode, the processor included in the controller 311 may control the received BLE identification information to be stored in the first memory and the internal memory of the communicator 313. Also, when the BLE identification information is changed or updated, the controller 311 may control the BLE identification information, which is stored in the first memory and the internal memory of the communicator 313, to be changed or updated by reflecting the change or the update thereto. Therefore, each of the first memory and the internal memory of the communicator 313 may store finally updated BLE identification information.

When the display device 310 starts the normal mode, the controller 311 may load a program corresponding to a first application to the second memory, the first application being for executing the ambient service, and may control the first application to be executed.

With reference to block 902 of FIG. 9, an operation of the display device 310 after the sleep mode is started is described below in detail.

During the sleep mode, the communicator 313 may continuously perform monitoring about whether a BLE signal is received (operation S918).

In block 902, operations S919 and S920 equally correspond to aforementioned operations S911 and S912, and thus detailed descriptions thereof are not provided.

After the sleep mode is started, the communicator 313 manages received BLE identification information. After the sleep mode is started, when BLE identification information is received from a mobile device, the communicator 313 wakes up the controller 311, based on a result of determining whether information corresponding to the received BLE identification information is present.

In the sleep mode, power is supplied only to the communicator 313, and thus only the communicator 313 remains in an active state, and power supply to other elements of the display device 310 may be blocked. Accordingly, in the sleep mode, the display 317 is turned off and thus a black screen may be shown. However, even after the sleep mode is started, the controller 311 may receive and recognize a signal of requesting a wake-up from the communicator 313.

In BLE pairing performed when the mobile device 360 is registered, BLE identification information of the registered mobile device 360 is stored in an internal memory (i.e., the internal memory 513 of FIG. 5) of the communicator 313. Therefore, when information corresponding to the received BLE identification information, i.e., the information being equal to the received BLE identification information, is present in the internal memory (i.e., the internal memory 513 of FIG. 5) of the communicator 313, the communicator 313 may determine that the mobile device 360 transmitted the BLE identification information is a registered device. Operation S921 is equal to operation S914, except for an operating subject. That is, operation S921 is performed by the communicator 313, and operation S914 is performed by the controller 311.

Afterward, the communicator 313 may perform a sequential operation based on a result of determining registration of the mobile device 360 transmitted the BLE identification information. When the communicator 313 determines that the mobile device 360 transmitted the BLE identification information is the registered device, the communicator 313 notifies the controller 311 of the result (operation S922). Accordingly, the controller 311 may receive the notification in operation S922 and thus may wake up (operation S923).

The controller 311 may determine that the registered mobile device 360 is located nearby, and may control the display device 310 to start the normal mode and execute the ambient service. The controller 311 may determine that the registered mobile device 360 is located nearby, and may control the display device 310 to start the normal mode in which the display device 310 is turned on. After the normal mode is started, when an ambient service on mode has been set by a user or by default, the controller 311 may control the ambient service to be executed.

When the communicator 313 determines that the mobile device 360 transmitted the BLE identification information is not the registered device, the communicator 313 may maintain the sleep mode. That is, the communicator 313 does not transmit the notification (operation S922) to the controller 311 and thus the controller 311 does not wake up.

FIG. 10 is a diagram for describing operations performed by a display device, according to an embodiment. Operations 1000 shown in FIG. 10 may be performed by any of the display devices and mobile devices described above, and, as an example, the operations 1000 shown in FIG. 10 are described below with reference to the display device 310 and the mobile device 360.

The operations 1000 shown in FIG. 10 correspond to the operation of block 901 of FIG. 9 in detail. That is, FIG. 10 illustrates in detail operations performed by the controller 311 of the display device 310.

Referring to FIG. 10, the display device 310 according to an embodiment performs a BLE pairing operation (operation S1010) and may register a certain mobile device. Because the BLE pairing operation has been described in detail with reference to FIG. 8, detailed descriptions thereof are not provided here.

After registration of the certain mobile device is completed, while an ambient service is being executed, the display device 310 may determine whether the registered mobile device is sensed (operation S1020). The fact that the ambient service is executed indicates that the display device 310 is in the normal mode, and thus the controller 311 may determine whether the registered mobile device is sensed.

That is, operation S1020 may correspond to operation S914 of FIG. 9. As described above with reference to operation S914, whether the registered mobile device is sensed may be determined based on whether information corresponding to received BLE identification information is stored in the memory 315.

As a result of determination in operation S1020, when the registered mobile device is sensed, the controller 311 may maintain execution of the ambient service (operation S1030).

As a result of determination in operation S1020, when the registered mobile device is not sensed, the controller 311 may output a notification message to receive confirmation of an end of execution of the ambient service (operation S1040). Here, the notification message may be output as an audio signal or a video signal. The controller 311 may control the display 317 to display a notification message such as 'Ambient service is now being ended' or 'Ambient service will now be ended. Please press a confirm button when you want to maintain execution'.

Afterward, when a user input is not sensed for a predetermined time period, the controller 311 may end the ambient service (operation S1045), and may control the display device 310 to end the normal mode and start the sleep mode (operation S1050).

The operation systems of mobile devices that are currently provided are broadly divided to two types. The operation systems of the mobile devices may be divided to iOS being developed and supplied by Apple Inc. and Android being developed and supplied by Google LLC.

The display device 310 according to an embodiment may differently set a scheme of recognizing a mobile device or a scheme of receiving a BLE signal, according to an OS of a certain mobile device.

The processor included in the controller 311 may differently set a scheme of recognizing the mobile device 360 to be paired for execution of the ambient service, according to an OS of the mobile device 360.

When a BLE pairing operation for registration of the mobile device 360 is performed, an OpCode Command Field (OCF) command may be transmitted from the mobile device 360 to the display device 310. The OCF command includes a field for defining a type of the OS of the mobile device 360.

When the OS of the mobile device 360 is Android, the display device 310 may receive the OCF command including <OS=Android>. Accordingly, the display device 310 may recognize that the OS of the mobile device 360 is an Android OS, and may set a scan period or a scan method which corresponds to the Android OS.

When the OS of the mobile device 360 is iOS, the display device 310 may receive the OCF command including <OS=iOS>. Accordingly, the display device 310 may recognize that the OS of the mobile device 360 is an iOS, and may set a scan period or a scan method which corresponds to the iOS.

FIGS. 11A to 11D illustrate operations of an ambient service executed in a display device paired with a mobile device having a first OS. For example, the first OS indicates an Android OS.

Figure 11A:
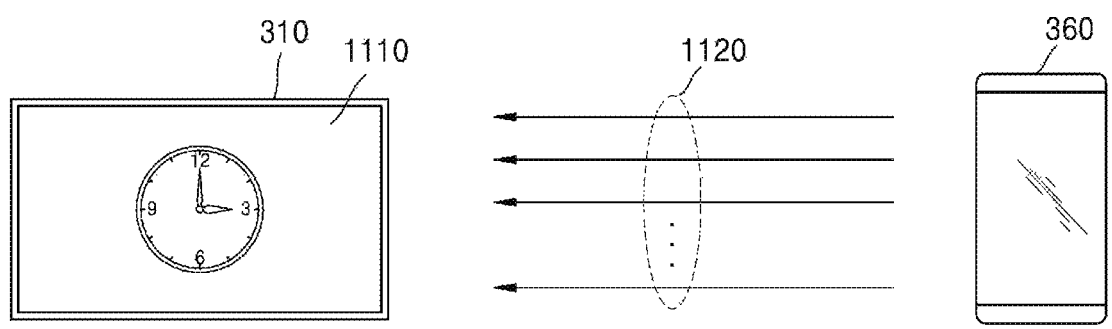
FIGS. 11A, 11B, 11C, and 11D illustrate operations of an ambient service executed in a display device paired with a mobile device according to an embodiment.

FIG. 11A illustrates an example in which the display device 310 executes the ambient service. Thus, the display device 310 may output, to a display screen 1110, a clock screen image corresponding to the ambient service.

Figure 11B:
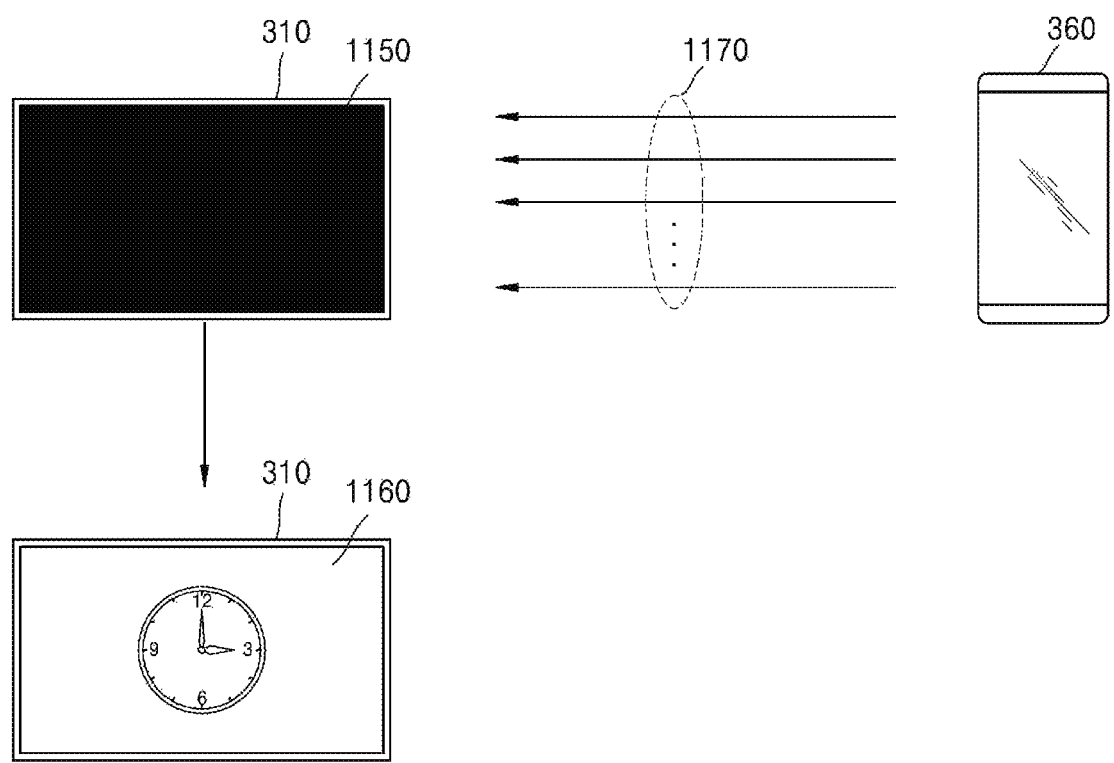
Figure 11C:
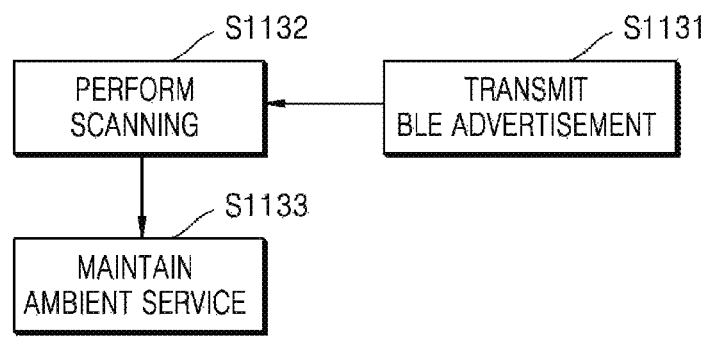

Referring to FIGS. 11A and 11C, the mobile device 360 having the Android OS transmits a BLE advertisement 1120 at regular time intervals (operation S1131). For example, the mobile device 360 may transmit the BLE advertisement 1120 at every 1-second intervals.

Then, the display device 310 may scan for or check whether a BLE signal or a BLE packet is received at regular time intervals (operation S1132). For example, the display device 310 may scan for or check, at every 15-minute intervals, whether a BLE signal or a BLE packet is received. The display device 310 may perform, at every 15-minute intervals, a scanning operation or a checking operation for 1 minute.

Operation S1132 may be performed by checking, by the communicator 313, whether the BLE signal or the BLE packet is received.

Afterward, the display device 310 may determine, by using the received BLE packet, whether the mobile device 360 transmitted the BLE packet is a device registered in the display device 310, and may maintain execution of the ambient service according to a result of the determination (operation S1133). Here, the BLE packet may indicate presence of the mobile device 360 by including BLE identification information, for example, a random address of the mobile device 360. The display device 310 may convert, by using an IRK obtained in BLE pairing, the received random address to a BLE address that is an original address and has transmitted in BLE pairing. Then, the display device 310 may determine whether the mobile device 360 is a registered device, by using the converted BLE address.

Also, because the display device 310 is in a normal mode in which the ambient service is executed, operation S1133 may be performed by the processor included in the controller 311.

Figure 11D:
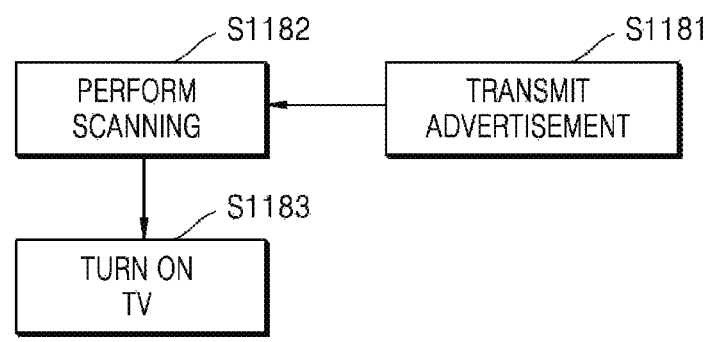

Referring to FIGS. 11B and 11D, the display device 310 starts a sleep mode and then is turned off, and outputs a black screen 1150. The mobile device 360 having an Android OS transmits a BLE advertisement 1120 at certain time intervals (operation S1181).

After the sleep mode is started, the communicator 313 may scan for or check whether a BLE signal or a BLE packet is received from a registered mobile device at certain time intervals (operation S1182). For example, the communicator 313 may scan for or check, at every 3-second intervals, whether a BLE signal or a BLE packet is received.

As a result of the scanning, when the BLE packet is received from the registered mobile device 360, the communicator 313 may wake up the display device 310. Accordingly, the display device 310 is turned on (operation S1183). Also, after the display device 310 is woke up and then starts a normal mode, the controller 311 may control the ambient service to be executed such that a clock screen image 1160 corresponding to the ambient service is output.

As described above, when an OS of the mobile device 360 that is a transmitting terminal is an Android OS, constant BLE advertisement is possible. In this case, BLE advertisement may be set to be performed every 1 second, in consideration of a service life of a battery of the mobile device 360. Also, in an embodiment which is shown in FIGS. 11A and 11B, the display device 310 that is a receiving terminal may perform a BLE scanning operation at a necessary time, e.g., during a predetermined time period of 15 minutes, and may check whether the registered mobile device is present around the display device 310.

When the registered mobile device is present around the display device 310, the display device 310 determines that the presence of a user is confirmed, and thus keeps its screen turned on. Accordingly, an image on the display screen 1110 that corresponds to the ambient service is continuously output. The display device 310 performs a BLE scanning operation at a next interval (e.g., in 15 minutes), and determines whether to keep its screen turned on.

As a result of the scanning operation (operation S1132) performed by the display device 310, a case in which a BLE packet including BLE identification information of an unregistered mobile device is received may occur. In this case, when the display device 310 does not find the registered mobile device as a result of performing the BLE scanning operation, the display device 310 may notify, by outputting a pop-up message, that the screen will be turned off in 1 minute, and may provide a user with an option of cancelling screen-off.

When the display device 310 determines that the mobile device 360 is not present, according to the result of the scanning operation (operation S1132), the display device 310 may turn off a screen of the display device 310. The display device 310 may display a window indicating that the screen of the display device 310 will be turned off in a predetermined time, and thus may notify a user that the screen is to be off.

When the display device 310 is turned off and thus starts a sleep mode, the display device 310 may record information about a previously-BLE paired mobile device, e.g., BLE identification information, BLE setting information, BT setting information, or the like to the communicator 313, for example, to firmware (FW) of the Bluetooth module 511 in FIG. 5 or to the internal memory 513 of the communicator 313, and may perform necessary setting to determine an approach of a mobile device after the display device 310 is turned off.

Even when the display device 310 is turned off, the display device 310 may continuously perform an operation of scanning for a BLE packet. This is specification necessary for communication between a remote controller and the display device 310 which conform to the Bluetooth communication standard according to the related art.

An operation mode in which, after the display device 310 is turned off, a Bluetooth module (e.g., the Bluetooth module 511 of FIG. 5) operates is called a low power mode (LPM). The aforementioned sleep mode may correspond to the LPM. The communicator 313 of the display device 310 may periodically perform, during the LPM, a BLE scanning operation of scanning for mobile devices. For example, the communicator 313 of the display device 310 may perform the BLE scanning operation at every 3-second intervals and may determine an approach of a mobile device. While the BLE scanning operation is being performed, when the previously-BLE paired mobile device, i.e., a mobile device registered in the display device 310, is found, a process of turning on the display device 310 may be performed. When the display device 310 is turned on, a previous operation mode of the display device 310 just before the display device 310 was turned off may be executed. For example, when the previous operation mode is an operation mode in which TV contents was output, the display device 310 may operate in an operation mode in which the display device 310 selects and outputs the TV contents that was previously output. Also, when the previous operation mode is an operation mode in which an ambient service was being executed, the display device 310 may operate in an operation mode in which the ambient service is executed in the display device 310.

Figure 12A:
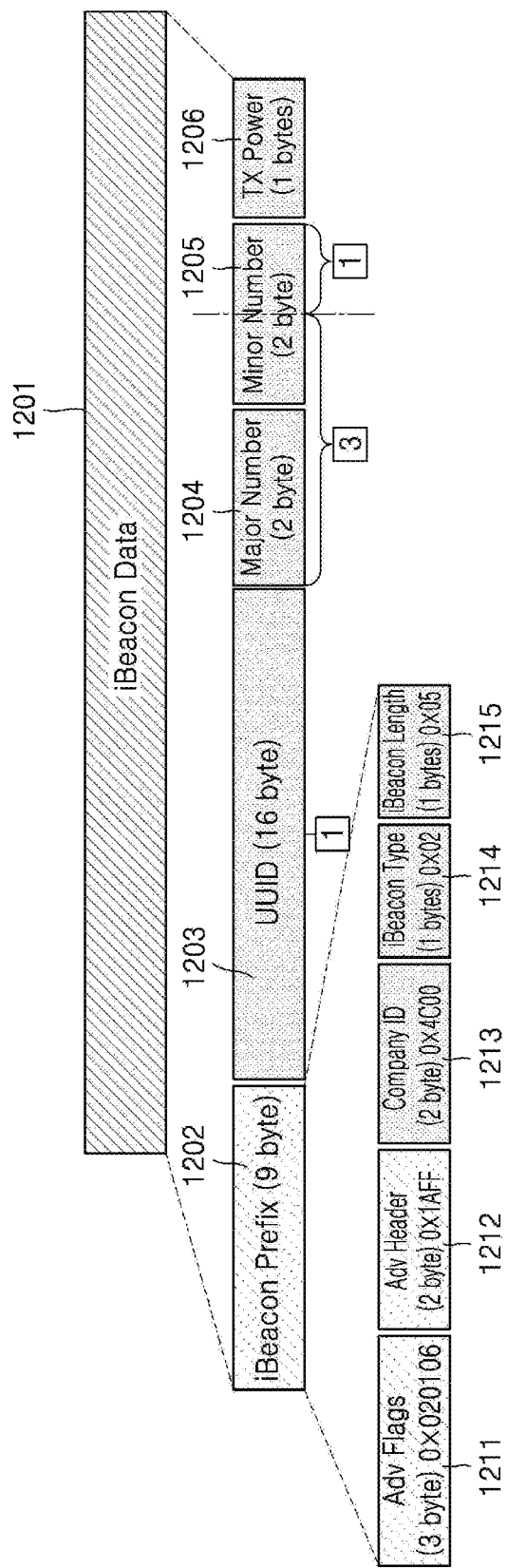
FIG. 12A illustrates a BLE signal transceived by a mobile device according to an embodiment.

FIG. 12A illustrates a BLE signal transceived by a mobile device having a second OS. Herein, the second OS is different from the first OS described in the FIGS. 11A to 11D. For example, the second OS indicates an iOS.

Figure 12B:
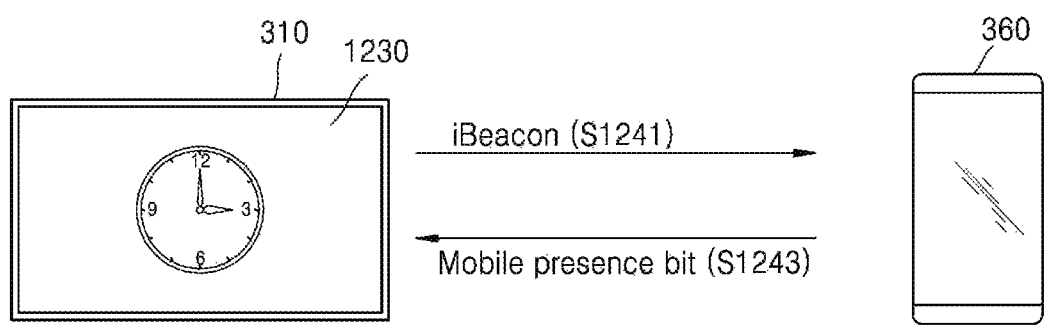
FIG. 12B is diagram for describing operations of an ambient service that is executed in a display device paired with the mobile device according to an embodiment.
Figure 12C:
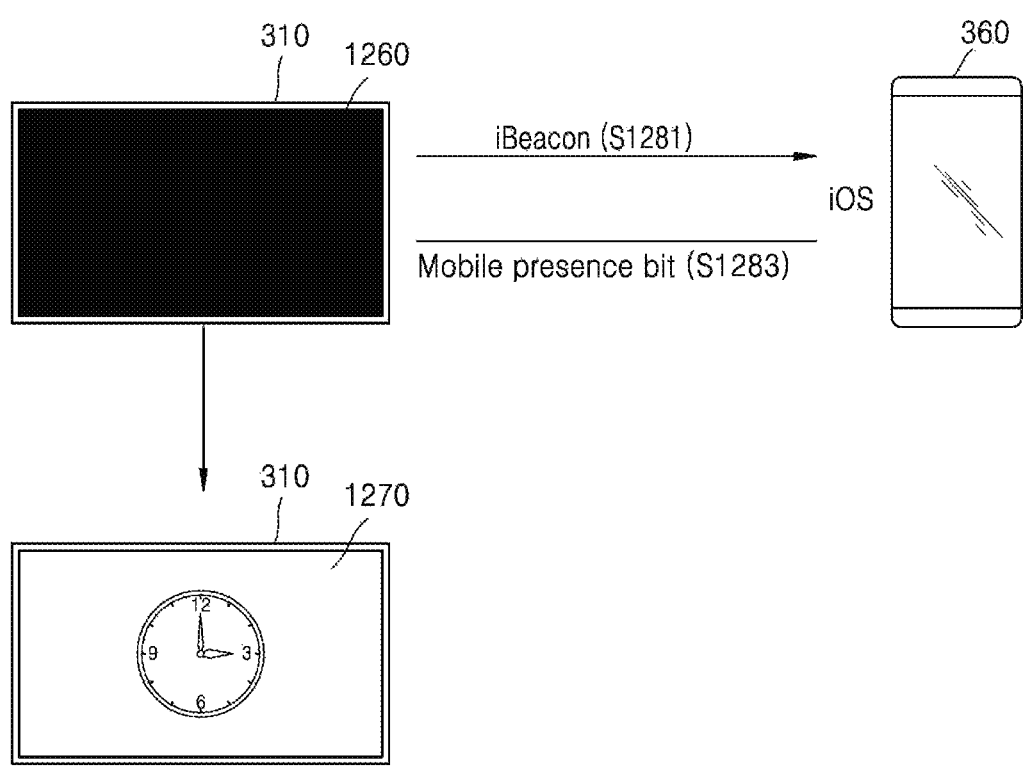
FIG. 12C is diagram for describing operations of an ambient service that is executed in a display device paired with the mobile device according to an embodiment.

FIGS. 12B and 12C are diagrams for describing operations of an ambient service that is executed in a display device paired with a mobile device having the second OS.

In an embodiment, when an OS of a registered mobile device is a second type OS, the controller 311 may control the communicator 313 to transmit, at certain time intervals, a first iBeacon signal for requesting transmission of BLE identification information to the mobile device, and to check reception of a second iBeacon signal triggered by the first iBeacon signal and including the BLE identification information.

The mobile device 360 having an iOS is triggered by receiving an iBeacon signal transmitted from the display device 310, and thus transmits an iBeacon signal including BLE identification information to the display device 310. When the registered mobile device has the iOS, the display device 310 may transmit, at certain time intervals, an iBeacon signal for requesting transmission of an iBeacon signal including BLE identification information to the mobile device 360 (operation S1241).

Referring to FIG. 12A, a BLE signal exchanged with the mobile device having the iOS may be an iBeacon signal. As illustrated in FIG. 12A, an iBeacon signal 1201 includes 3 fields that are universally unique identifier (UUID) 1203, major identification (ID) 1204, and minor ID 1205. The iBeacon signal 1201 may include 2 fields of iBeacon prefix 1202 and Tx power 1206. The iBeacon prefix 1202 may include fields of Adv flags 1211, Adv header 1212, company ID 1213, an iBeacon-signal type 1214, and an iBeacon-signal length 1215.

The UUID 1203 having 16 bytes may be used as an identifier of a service that is used as the mobile presence among a plurality of iBeacon signals. The major ID 1204 having 2 bytes and the minor ID 1205 having 2 bytes may be used as unique information and a command of the display device 310 that is a receiving terminal. For example, 3 bytes including 2 bytes of major ID 1204 and 1 byte of the minor ID 1205 may be used in transmitting BLE identification information such as a BLE MAC Address or a random address of the display device 310, and remaining 1 byte of the minor ID 1205 may be used as a command for each service.

The mobile device having the iOS may be implemented to transmit a BLE packet in response to a set iBeacon signal. The mobile device having the iOS may be implemented to transmit an iBeacon signal (BLE advertisement), in response to reception of the iBeacon signal as a command requesting transmission of a BLE packet from a display device.

FIG. 12B illustrates an example in which the display device 310 executes an ambient service. The display device 310 displays a clock screen image corresponding to the ambient service.

Referring to FIG. 12B, when the mobile device registered in the display device 310 has the iOS, the display device 310 may transmit an iBeacon signal at regular time intervals (operation S1241). When the mobile device 360 receives the iBeacon signal transmitted from the display device 310, the mobile device 360 may respond thereto and thus may transmit an iBeacon signal including BLE identification information to the display device 310 (operation S1243).

The mobile device having the iOS is not enabled for constant BLE advertisement. Therefore, when the display device 310 that is a receiving terminal attempts to determine an approach of a mobile device (e.g., at every 15-minute intervals), the display device 310 may transmit an iBeacon signal to request the mobile device to respond with the iBeacon signal.

The mobile device 360 having received the iBeacon signal of the display device 310 transmits an iBeacon signal including BLE identification information. The mobile device 360 having received the iBeacon signal executes an application for providing an ambient service, and the application may transmit, to the registered display device 310, an iBeacon signal that is BLE advertisement (operation S1243).

Accordingly, the display device 310 may determine whether a registered mobile device approaches. A sequential operation (e.g., an operation of maintaining execution of the ambient service) performed when the registered mobile device approaches is the same as an operation described with reference to FIG. 11A.

A mobile device recognition scheme illustrated in FIG. 12B may be applied to not only the mobile device having the iOS and but may also be applied to a mobile device in which constant BLE advertisement is not enabled.

When the mobile device having the iOS is registered in the display device 310, after BLE pairing is completed, the display device 310 may set and store information about the mobile device and information requiring an exchange of an iBeacon signal.

The display device 310 may be set such that, when the display device 310 is turned off, the Bluetooth module 511 of the communicator 313 periodically (e.g., every 150 milliseconds (ms)) transmits an iBeacon signal. An operation performed by the display device 310 according to whether, after the mobile device transmits an iBeacon signal, the registered mobile device approaches is the same as an operation described with reference to FIGS. 11A to 11D, and thus, detailed descriptions thereof are not provided here.

Intervals at which the display device 310 transmits an iBeacon signal may be variously set. For example, the display device 310 may transmit an iBeacon signal to the mobile device at every 150-millisecond intervals, and when the mobile device transmits a response thereto, the display device 310 may check reception of the response at every 3-second intervals.

Referring to FIG. 12C, the display device 310 that started a sleep mode and thus was turned off outputs a black screen 1260.

After the sleep mode is started, the communicator 313 may transmit an iBeacon signal to the mobile device 360 having the iOS at certain time intervals (operation S1281), and the mobile device 360 having received the iBeacon signal may transmit an iBeacon signal to the communicator 313 of the display device 310 (operation S1283). The communicator 313 of the display device 310 may determine whether the received iBeacon signal has been transmitted from the registered mobile device, and may determine whether the registered mobile device is positioned nearby.

When the display device 310 determines that the registered mobile device is positioned nearby, the communicator 313 may wake up the display device 310. Accordingly, the display device 310 is turned on.

Also, after the display device 310 is woke up and then starts a normal mode, the controller 311 may control the ambient service to be started and output a clock screen image 1270 corresponding to the ambient service.

Figure 13:
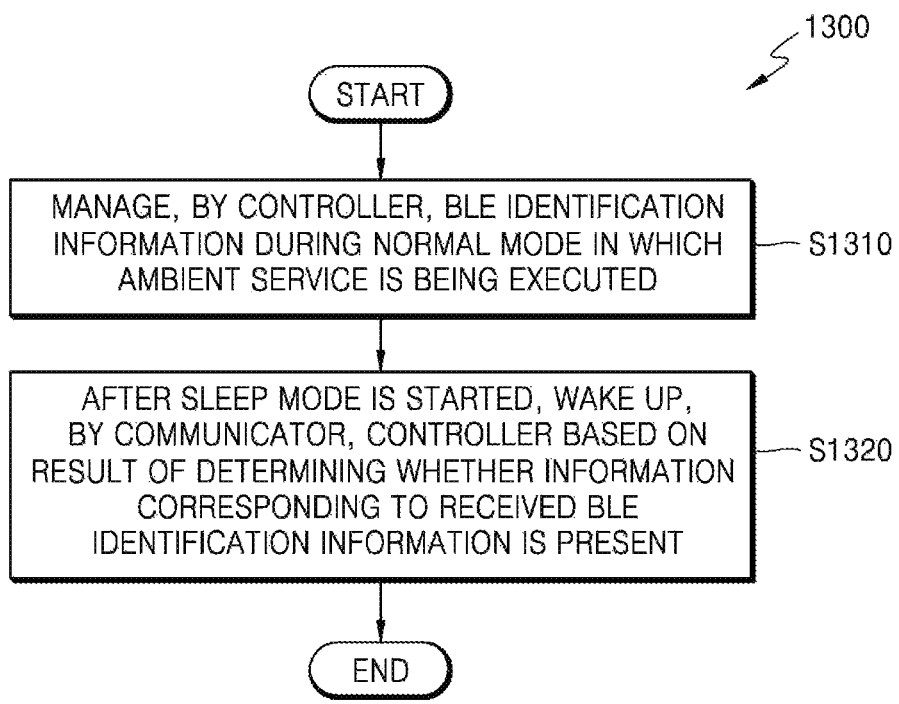
FIG. 13 is a flowchart illustrating a control method of the display device, according to an embodiment.

FIG. 13 is a flowchart illustrating a control method 1300 of a display device, according to an embodiment. The control method 1300 according to an embodiment is equal to operations performed by the display device 310 according to an embodiment, the operation being described with reference to FIGS. 1 to 12C. Therefore, the overlapping descriptions with respect to FIGS. 1 to 12C are not provided when the control method 1300 according to an embodiment is described.

The control method 1300 is described in detail below with reference to the display device 310 and the mobile device 360 which are shown in FIG. 4.

The control method 1300 according to an embodiment is a control method of the display device 310 including the memory 315 storing at least one instruction, the communicator 313 configured to communicate with a mobile device via at least one wireless network including a BLE communication network, and the controller 311 including at least one processor configured to execute the at least one instruction stored in the memory.

Referring to FIG. 13, when BLE identification information that is information for identifying the mobile device 360 connected via the BLE communication network is received during a normal mode in which an ambient service is being executed, the control method 1300 of the display device 310 includes managing, by the controller 311, the BLE identification information (operation S1310). Operation S1310 may be performed by the controller 311 of the display device 310.

Because operation S1310 corresponds to block 901 of FIG. 9, detailed descriptions thereof are not provided here.

When the BLE identification information is received from the mobile device 360 after a sleep mode is started, the control method 1300 of the display device 310 includes waking up, by the communicator 313, the controller 311 based on a result of determining whether information corresponding to the received BLE identification information is present (operation S1320). Operation S1320 may be performed by the communicator 313 of the display device 310.

Because operation S1320 corresponds to block 902 of FIG. 9, detailed descriptions thereof are not provided here.

In the control method 1300 of the display device according to an embodiment, operation S1310 and operation S1320 are distinguished according to whether the display device 310 is in the normal mode or whether the sleep mode is started, and an order of operation S1310 and operation S1320 may be switched therebetween.

Figure 14:
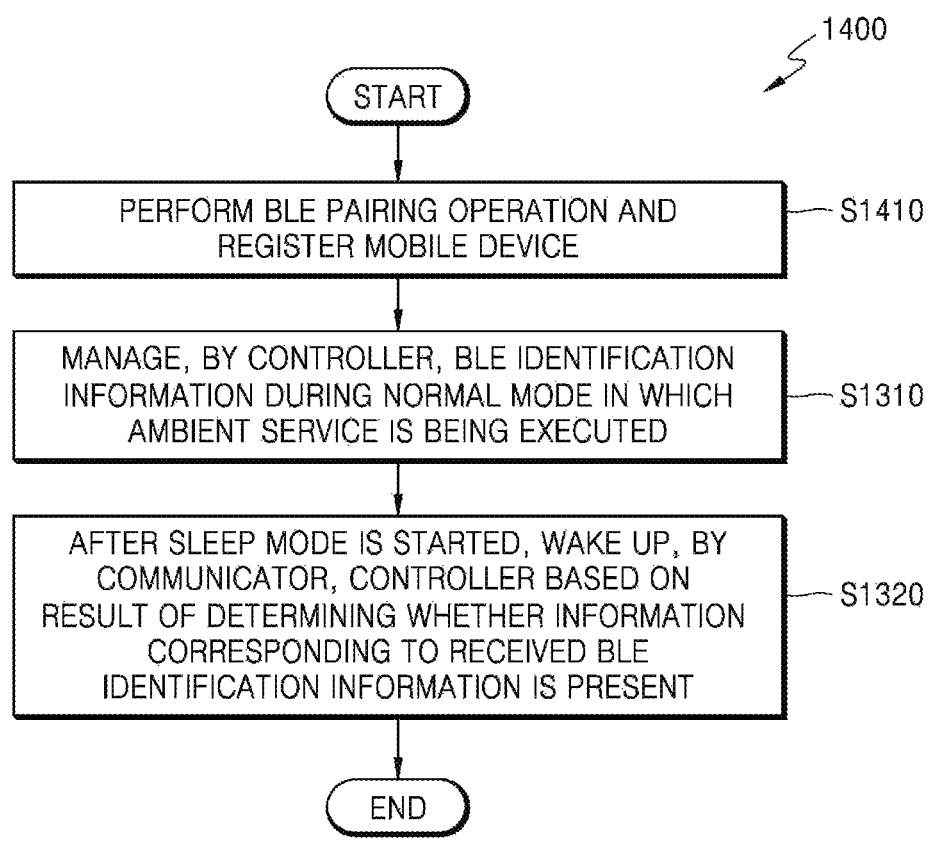
FIG. 14 is a flowchart illustrating in detail a control method of a display device according to an embodiment.

FIG. 14 is a flowchart illustrating in detail a control method 1400 of a display device according to an embodiment. The control method 1400 illustrated in FIG. 14 corresponds to a detailed one of the control method 1300 of the display device illustrated in FIG. 13. In the control method 1400 illustrated in FIG. 14, like operations of those of the control method 1300 of FIG. 13 denote like reference numerals.

Referring to FIG. 14, the control method 1400 may include operation S1410, compared to the control method 1300.

The control method 1400 may include operation S1410 of performing a BLE pairing operation and registering a mobile device. Operation S1410 may be performed by the controller 311 of the display device 310. Because the BLE pairing operation has been described in detail with reference to FIG. 8, detailed descriptions thereof are not provided here.

According to the control method of the display device and the display device thereof according to embodiments of the disclosure, power consumption of the display device providing the ambient service may be decreased.

Also, according to the control method of the display device and the display device thereof according to embodiments of the disclosure, the display device providing the ambient service may easily turn on or off its screen while decreasing power consumption of the display device, so that a decrease in a service life of a panel of the display device may be prevented.

Also, according to the control method of the display device and the display device thereof according to embodiments of the disclosure, the display device may appropriately provide the ambient service according to a type of an OS of a mobile device connected via the BLE communication network.

The control method of the display device according to the embodiments of the disclosure may be embodied as programmed commands to be executed in various computer units, and then may be recorded in a non-transitory computer-readable medium. The embodiments of the disclosure may be embodied as a non-transitory computer-readable recording medium having recorded thereon one or more programs including instructions to execute the control method of the display device.

The non-transitory computer-readable recording medium may include one or more of the programmed commands, data files, data structures, or the like. The programmed commands recorded to the non-transitory computer-readable recording medium may be particularly designed or configured for the disclosure or may be known to one of ordinary skill in the art. Examples of the non-transitory computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only a machine code made by a compiler but also include a high-level programming language to be executed in a computer by using an interpreter.

Further, the control method of the display device according to the embodiments of the disclosure may be implemented in a computer program product including a non-transitory computer-readable medium having recorded thereon a program for obtaining a sentence in a multi lingual, obtaining vector values corresponding to each words included in the sentence by using a multi lingual translation model, converting the obtained vector values to vector values corresponding to a target language, and obtaining a sentence in the target language based on the converted vector values.

While the embodiments of the disclosure have been particularly described, the spirit and scope of the disclosure may also include various changes and improvements in form and details which are made by those of ordinary skill in the art, in view of a basic concept of the disclosure as defined by the appended claim.

What is claimed is:

1. A display device comprising:
a display;
a memory storing at least one instruction;
a communicator configured to communicate with a mobile device via at least one wireless network comprising a Bluetooth low energy (BLE) communication network, and receive BLE identification information for identifying the mobile device, from the mobile device; and
a controller comprising at least one processor configured to execute the at least one instruction to:
control identification information to be respectively stored in both the memory and a dedicated memory so that the identification information stored in the memory is the same as the identification information stored in the dedicated memory for the communicator, and
based on the receiving, by the communicator, the BLE identification information from the mobile device while the display device operates in a normal mode in which a service for displaying a screen image on the display is being executed, determine whether a registered mobile device is present based on whether identification information corresponding to the BLE identification information received from the mobile device is stored in the memory,
wherein, based on the receiving, by the communicator, the BLE identification information from the mobile device while the display device operates in a sleep mode, the communicator is further configured to determine whether to wake up the controller based on whether identification information corresponding to the BLE identification information received from the mobile device is stored in the dedicated memory for the communicator that is different from the memory.

2. The display device of claim 1, wherein the communicator is further configured to wake up the controller based on the identification information corresponding to the BLE identification information being present in the dedicated memory.

3. The display device of claim 1, wherein the communicator is further configured to maintain the sleep mode of the controller based on the identification information corresponding to the BLE identification information not being present in the dedicated memory.

4. The display device of claim 1, wherein the at least one processor is further configured to execute, in the normal mode, the at least one instruction to receive the BLE identification information from the communicator, determine whether the identification information corresponding to the BLE identification information is present in the memory, and determine whether to maintain the executing the service, based on a result of the determining.

5. The display device of claim 1, wherein the memory comprises a first memory and a second memory, and
the at least one processor is further configured to execute the at least one instruction to control the BLE identification information of the mobile device to be stored in the first memory and the dedicated memory of the communicator based on the BLE identification information received from the mobile device in the normal mode, and when the normal mode is started, load, into the second memory, a program corresponding to a first application for executing the service, and control the first application to be executed.

6. The display device of claim 1, wherein the mobile device is a first mobile device having a first BLE identification information stored as the identification information in the memory, and
the at least one processor is further configured to execute the at least one instruction to:
receive a second BLE identification information from a second mobile device to be paired with the display device, to register the second mobile device, and
store the second BLE identification information in the memory and the dedicated memory of the communicator.

7. The display device of claim 1, wherein the sleep mode comprises an operation mode in which the service is stopped and then the display is turned off.

8. The display device of claim 1, wherein the at least one processor is further configured to execute the at least one instruction to control the BLE identification information to be stored in the memory, the BLE identification information being transmitted from the mobile device paired with the display device for execution of the service, and determine, by using, the BLE identification information, whether the mobile device is positioned within a predetermined distance from the display device.

9. The display device of claim 1, wherein the BLE identification information comprises a BLE media access control (MAC) address of the mobile device or a random address of the mobile device, the random address being convertible to the BLE MAC address by using an Identity Resolving Key (IRK).

10. The display device of claim 1, wherein the at least one processor is further configured to execute the at least one instruction to differently set a scheme of identifying the mobile device based on an operating system (OS) of the mobile device registered in the display device.

11. A display device comprising:
a display;
a memory storing at least one instruction;
a communicator configured to communicate with a mobile device via at least one wireless network comprising a Bluetooth low energy (BLE) communication network; and
a controller comprising at least one processor configured to execute the at least one instruction stored in the memory,
wherein, based on receiving BLE identification information for identifying the mobile device from the mobile device via the BLE communication network while the display device operates in a normal mode in which a service for displaying a screen image on the display is being executed, the at least one processor is further configured to execute the at least one instruction to determine whether a registered mobile device is present based on whether information corresponding to the BLE identification information received from the mobile device is stored in the memory,
based on receiving the BLE identification information from the mobile device while the display device operates in a sleep mode, the communicator is further configured to determine whether to wake up the controller based on whether the information corresponding to the BLE identification information is stored in the communicator, and
the at least one processor is further configured to execute the at least one instruction to differently set a scheme of identifying the mobile device, according to whether an operating system (OS) of the mobile device registered in the display device is a first OS or a second OS.

12. The display device of claim 11, wherein the first OS is an Android OS and the second OS is an iOS.

13. The display device of claim 11, wherein the mobile device is registered in the display device and the OS of the mobile device is the first OS, and
the at least one processor is further configured to execute the at least one instruction to control the communicator to check reception of the BLE identification information at certain time intervals.

14. The display device of claim 11, wherein the mobile device is registered in the display device and the OS of the mobile device is the second OS, and
the at least one processor is further configured to execute the at least one instruction to control the communicator to transmit, at certain time intervals, a first iBeacon signal for requesting transmission of the BLE identification information to the mobile device, and
check reception of a second iBeacon signal triggered by the first iBeacon signal and comprising the BLE identification information.

15. A control method of a display device, the control method comprising:
respectively storing identification information in both a memory of the display device and a dedicated memory for a communicator of the display device so that the identification information stored in the memory is the same as the identification information stored in the dedicated memory;
based on receiving, by the communicator of the display device via a Bluetooth low energy (BLE) communicator network, a BLE identification information, for identifying a mobile device, from the mobile device, while the display device operates in a normal mode in which a service for displaying a screen image on a display of the display device is being executed, determining, by a controller of the display device, whether a registered mobile device is present based on whether identification information corresponding to the BLE identification information received from the mobile device is stored in the memory of the display device; and
based on receiving, by the communicator, the BLE identification information from the mobile device while the display device operates in a sleep mode, determining, by the communicator, whether to wake up the controller based on whether identification information corresponding to the BLE identification information received from the mobile device is stored in the dedicated memory for the communicator that is different from the memory of the display device.

16. The control method of claim 15, wherein the determining whether to wake up the controller further comprises:
transmitting, by the communicator, a signal for waking up the controller to the controller, based on the identification information corresponding to the BLE identification information being present in the dedicated memory of the communicator.

17. The control method of claim 15, wherein the determining whether to wake up the controller further comprises:
maintaining the sleep mode of the controller, based on the receiving the BLE identification information after the sleep mode is started and the identification information corresponding to the BLE identification information not being present in the dedicated memory of the communicator.

18. The control method of claim 15, wherein the mobile device is a first mobile device having a first BLE identification information stored as the identification information in the memory, and
the control method further comprises:
receiving a second BLE identification information from a second mobile device to be paired with the display device, to register the second mobile device; and
storing the second BLE identification information in the memory.

19. A control method of a display device, the control method comprising:
based on receiving, by a communicator of the display device via a Bluetooth low energy (BLE) communication network, a BLE identification information, for identifying a mobile device, from the mobile device, while the display device operates in a normal mode in which a service for displaying a screen image on a display of the display device is being executed, determining, by a controller of the display device, whether a registered mobile device is present based on whether information corresponding to the BLE identification information received from the mobile device is stored in a memory of the display device; and based on receiving, by the communicator, the BLE identification information from the mobile device while the display device operates in a sleep mode, determining, by the communicator, whether to wake up the controller based on whether information corresponding to the BLE identification information received from the mobile device is stored in the communicator, wherein the control method further comprises differently setting a scheme of identifying the mobile device, according to whether an operating system (OS) of the mobile device registered in the display device is a first OS or a second OS.

20. The control method of claim 19, further comprising: based on the mobile device being registered in the display device and the OS of the mobile device being the first OS, checking reception of the BLE identification information at certain time intervals.

21. The control method of claim 19, further comprising based on the mobile device being registered in the display device and the OS of the mobile device being the second OS, transmitting, at certain time intervals, a first iBeacon signal for requesting transmission of the BLE identification information to the mobile device, and checking reception of a second iBeacon signal triggered by the first iBeacon signal and comprising the BLE identification information.

22. A display device comprising:
a display;
a communicator comprising a communication interface configured to communicate with a plurality of mobile devices via a Bluetooth low energy (BLE) communication network, a first processor, and a first memory configured to store BLE identification information for identifying the plurality of mobile devices, respectively;
a controller comprising a second processor; and
a second memory configured to store the BLE identification information for identifying the plurality of mobile devices, wherein, based on receiving, by the communicator, first BLE identification information, for identifying a first mobile device, from the first mobile device, while the display device operates in a normal mode in which a service for displaying a screen image on the display is being executed, the second processor is configured to determine whether the first mobile device among the plurality of mobile devices is registered with the display device based on matching the first BLE identification information with the BLE identification information stored in the second memory, based on receiving, by the communicator, the first BLE identification information from the first mobile device while the display device operates in a sleep mode, the first processor is configured to wake up the controller based on whether information corresponding, to the first BLE identification information is stored in the first memory different from the second memory, and the BLE identification information for identifying the plurality of mobile devices that is stored in the second memory is the same as the information stored in the first memory.

23. The display device of claim 22, wherein the second processor is further configured to:
based on the first BLE identification information received while the service is executed not being present in the BLE identification information stored in the second memory, determine that the first mobile device is not registered in the display device,
terminate the service, and
control the first processor to start the sleep mode.

24. The display device of claim 22, wherein the first BLE identification information comprises one from among, a BLE media access control (MAC) address of the first mobile device and a random address of the first mobile device, the random address being convertible to the BLE MAC address of the first mobile device by using an Identity Resolving Key (IRK).

* * * * *